United States Patent
Mitchell

(10) Patent No.: US 10,929,609 B1
(45) Date of Patent: Feb. 23, 2021

(54) MODELING ENGLISH SENTENCES WITHIN A DISTRIBUTED NEURAL NETWORK FOR COMPREHENSION AND UNDERSTANDING OF A NEWS ARTICLE

(71) Applicant: Marcia Theresa Mitchell, Closter, NJ (US)

(72) Inventor: Marcia Theresa Mitchell, Closter, NJ (US)

(73) Assignee: RM², LLC, Closter, NJ (US)

( * ) Notice: Subject to any disclaimer, the term of this patent is extended or adjusted under 35 U.S.C. 154(b) by 42 days.

(21) Appl. No.: 16/019,155

(22) Filed: Jun. 26, 2018

Related U.S. Application Data

(60) Provisional application No. 62/524,858, filed on Jun. 26, 2017.

(51) Int. Cl.
| | |
|---|---|
| *G06F 40/30* | (2020.01) |
| *G06F 40/205* | (2020.01) |
| *G06N 3/04* | (2006.01) |
| *G06F 40/284* | (2020.01) |

(52) U.S. Cl.
CPC ............ *G06F 40/30* (2020.01); *G06F 40/205* (2020.01); *G06F 40/284* (2020.01); *G06N 3/04* (2013.01)

(58) Field of Classification Search
CPC .......... G06F 40/30; G06F 40/205; G06N 3/04
See application file for complete search history.

(56) References Cited

U.S. PATENT DOCUMENTS

| | | | |
|---|---|---|---|
| 2006/0136194 A1* | 6/2006 | Armstrong | G06F 16/367 704/4 |
| 2008/0215607 A1* | 9/2008 | Kaushansky | G06F 16/9535 |
| 2010/0161655 A1* | 6/2010 | Gil | G06F 16/313 707/769 |
| 2010/0235353 A1* | 9/2010 | Warnock | G06F 16/338 707/723 |
| 2016/0034812 A1* | 2/2016 | Gibson | G06N 3/08 706/25 |
| 2016/0098389 A1* | 4/2016 | Bruno | G06F 40/205 704/9 |
| 2016/0117397 A1* | 4/2016 | Bansal | G06F 16/9535 707/723 |
| 2016/0203566 A1* | 7/2016 | Kataria | H04L 51/16 709/206 |
| 2017/0286399 A1* | 10/2017 | Popescu | G06F 40/247 |
| 2018/0089064 A1* | 3/2018 | Duer | G06F 11/323 |

* cited by examiner

*Primary Examiner* — Bryan S Blankenagel
(74) *Attorney, Agent, or Firm* — Dunlap Bennett & Ludwig, PLLC; Brendan E. Squire

(57) ABSTRACT

A distributed neural network comprehend news articles that emulate language processing of English sentences and derive basic understanding. The method of computation implements the MAYA Semantic Technique (Mitchell, 2015), a mathematical technique I previously developed to determine partial semantics of sentences within a natural language processing program. The results of the model shows how a distributed neural network that composed of the words, part-of-speech and its lexical synset can be constructed to comprehend news articles and determine basic understanding of the text. The text can be from either news, journals or magazine articles.

8 Claims, 43 Drawing Sheets

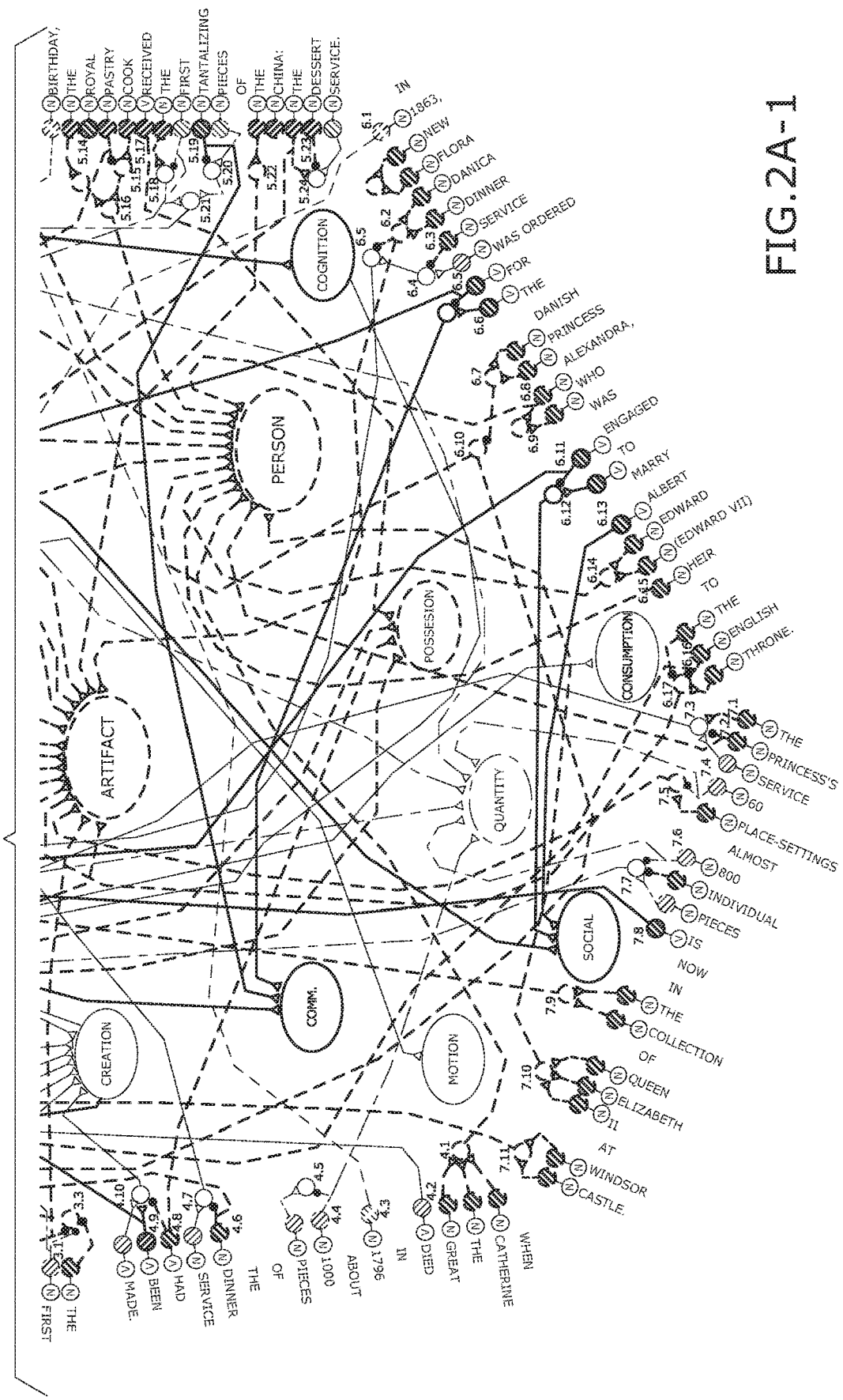

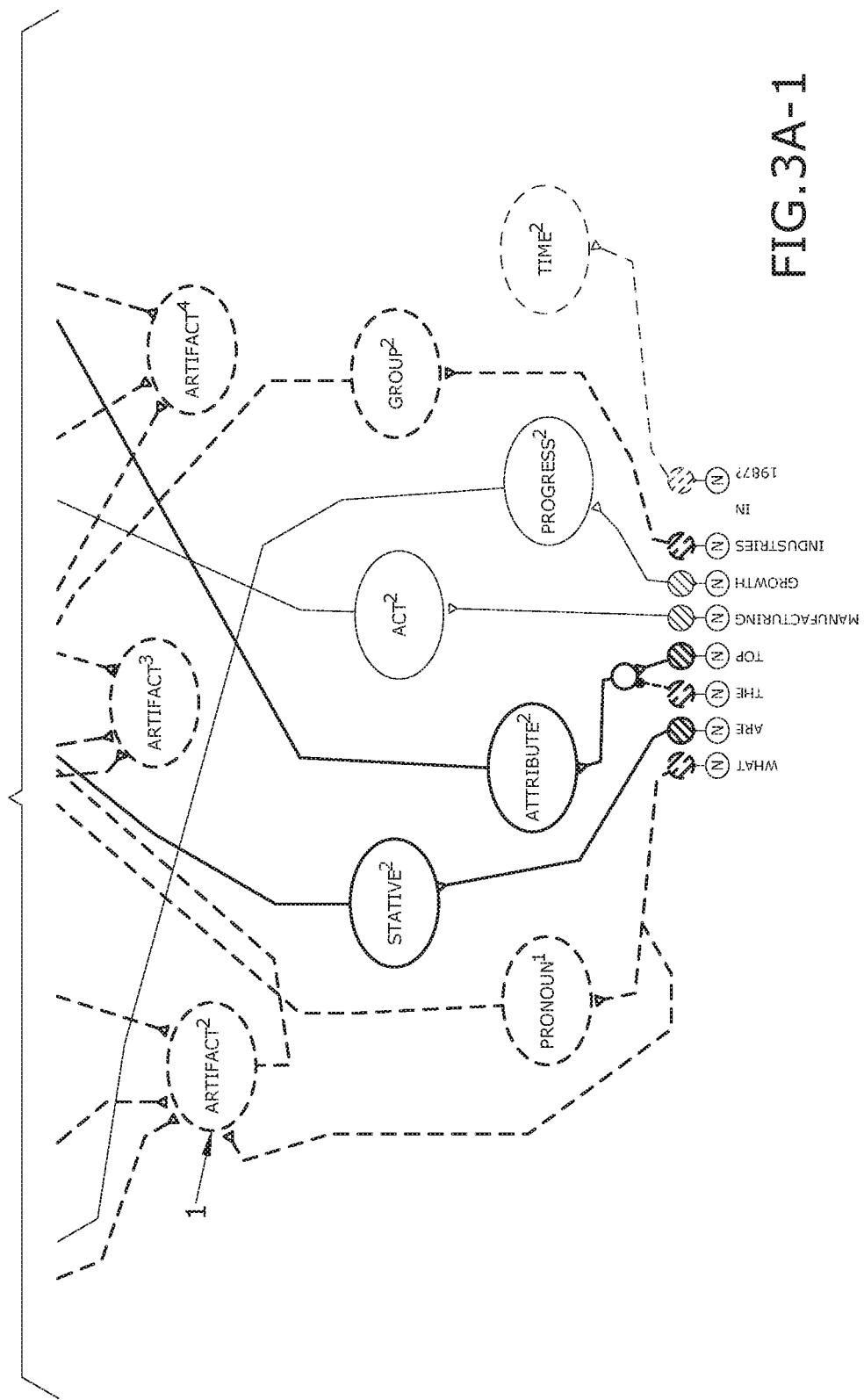

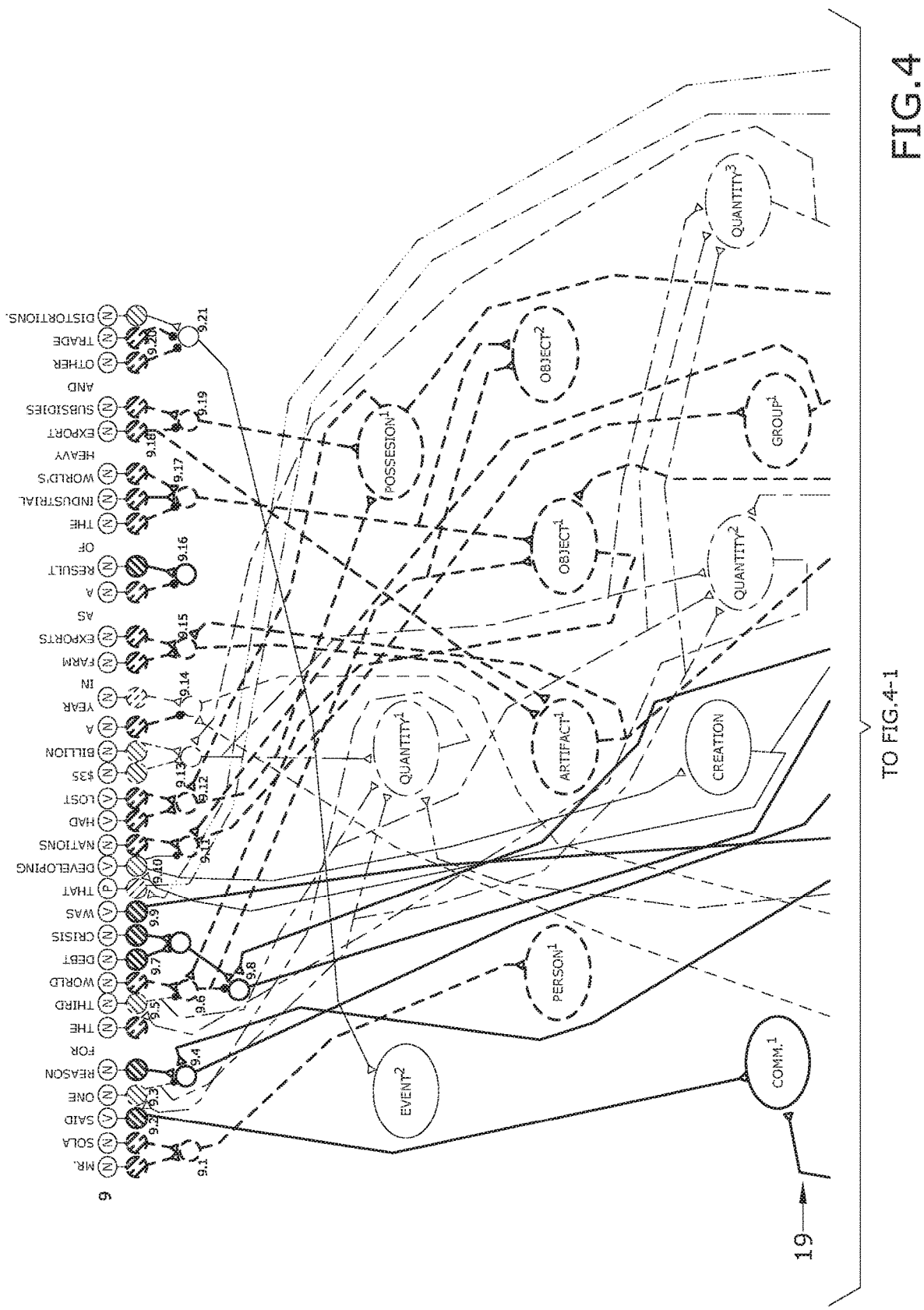

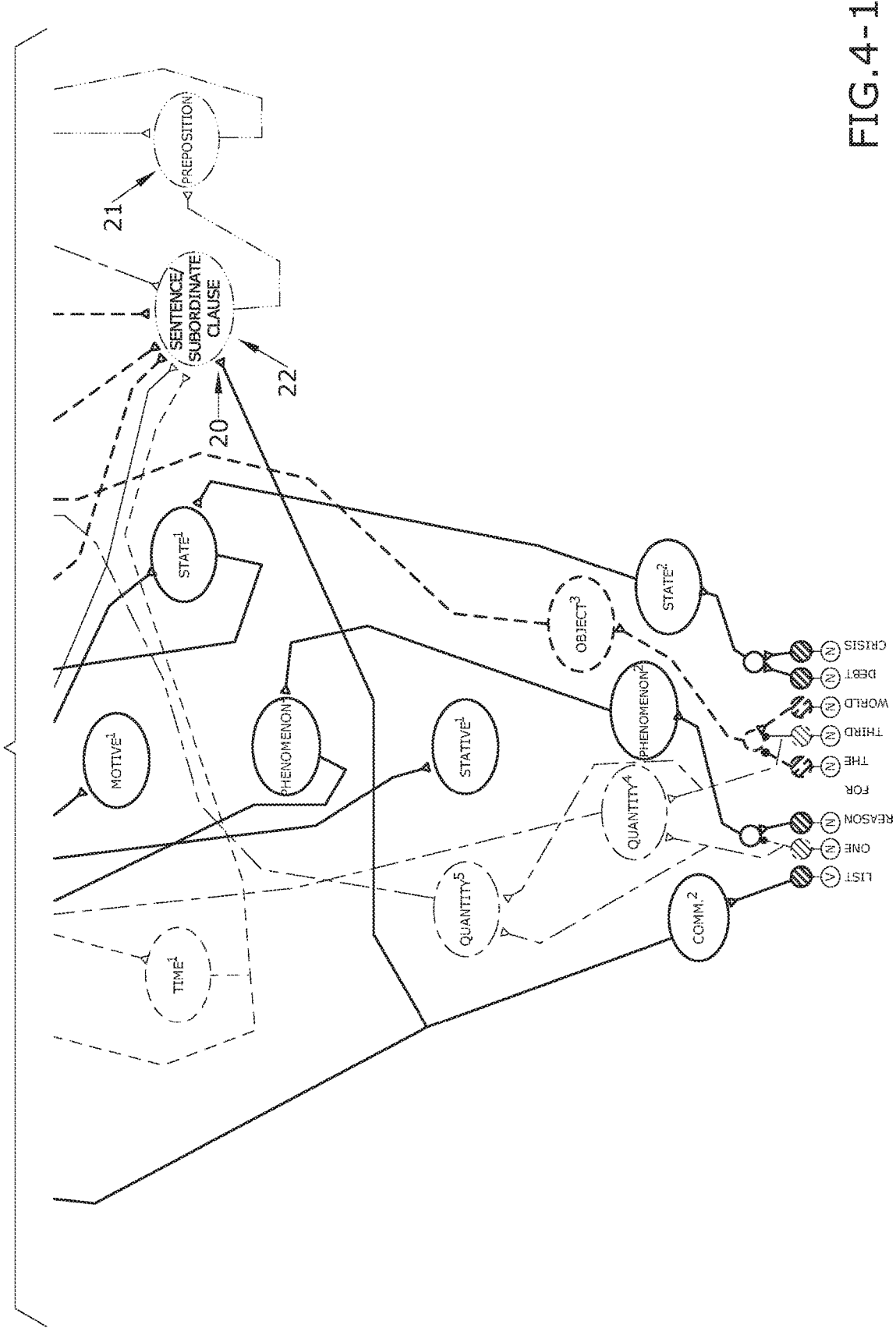

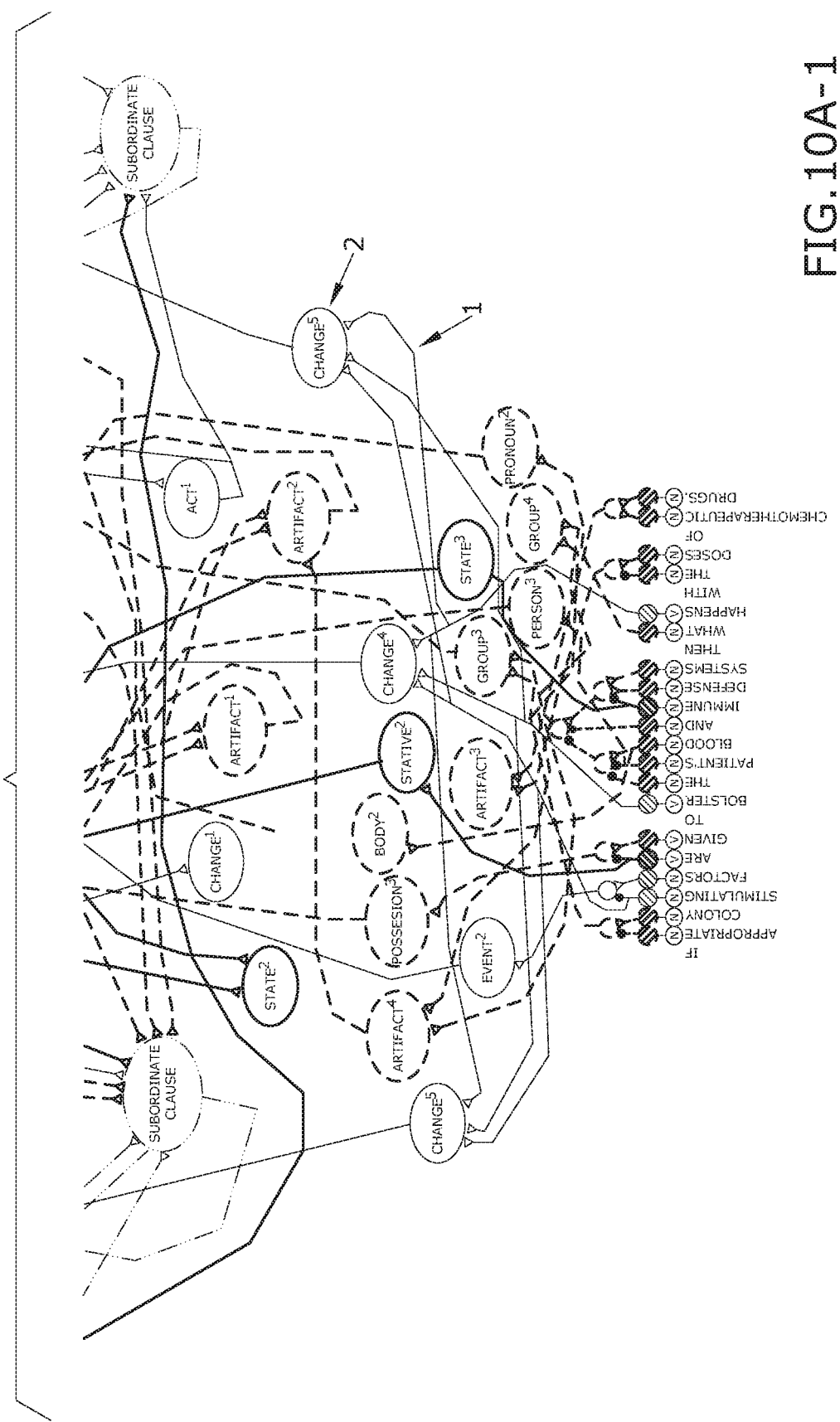

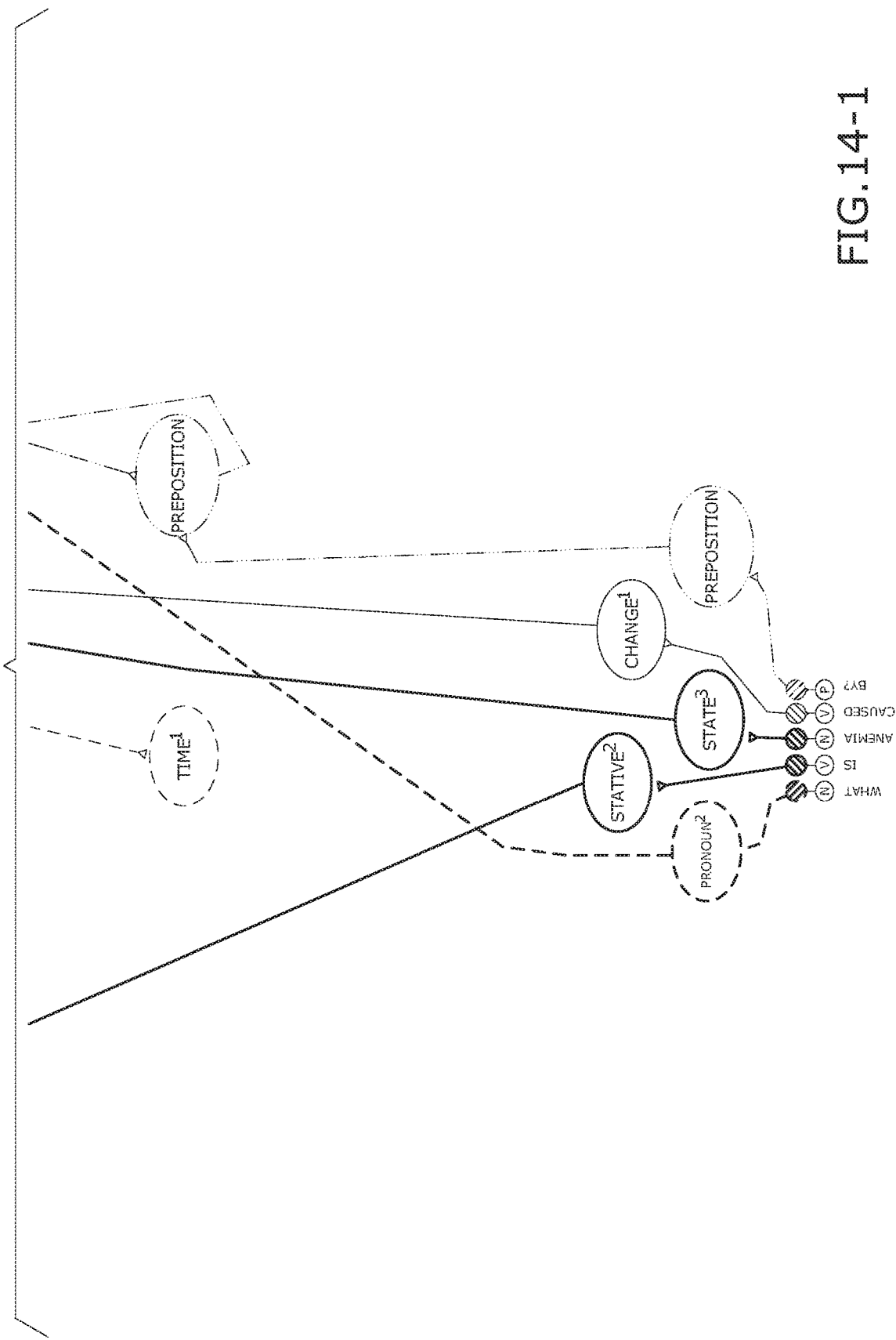

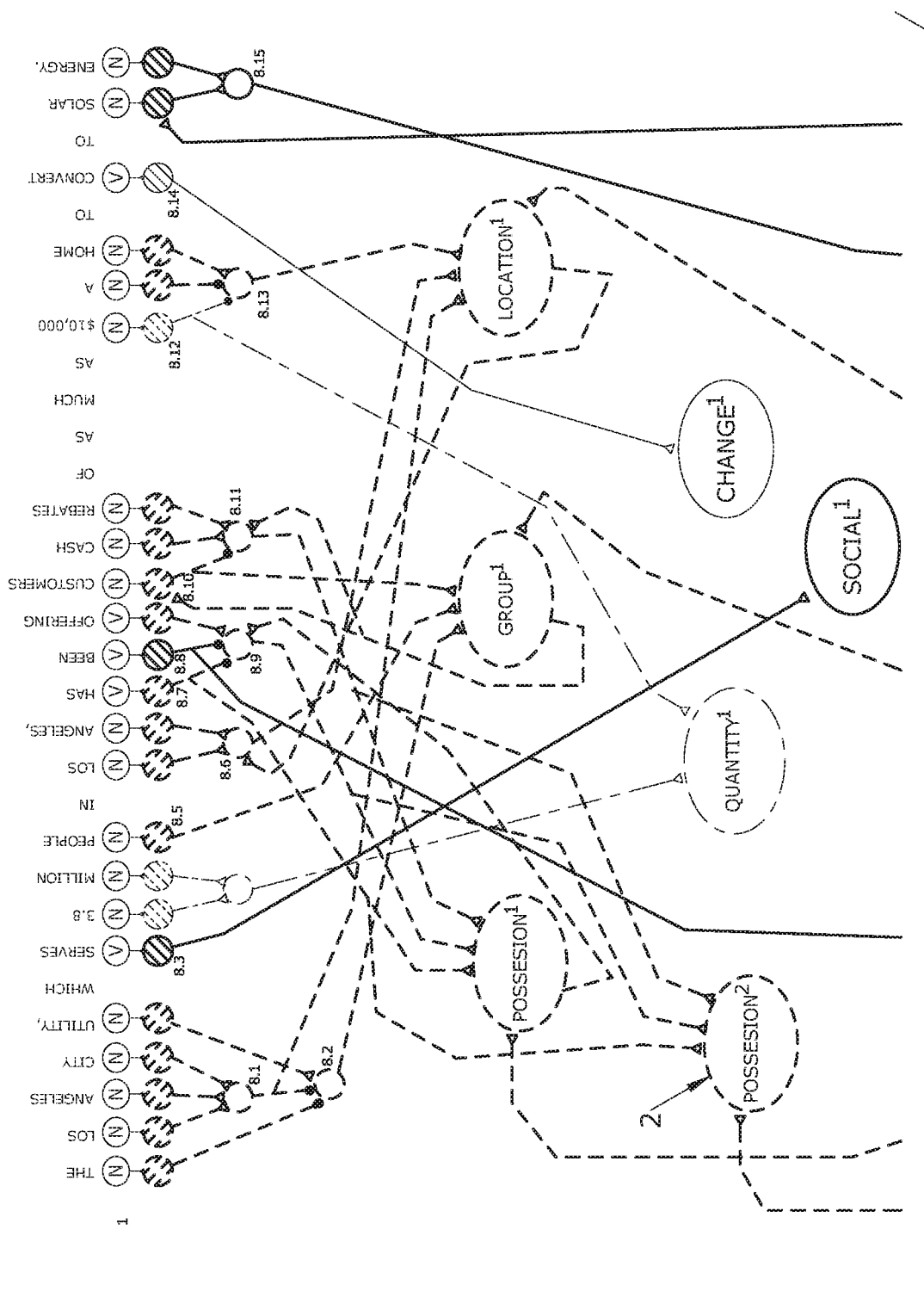

MODELING ENGLISH SENTENCES WITHIN A DISTRIBUTED NEURAL NETWORK FOR COMPREHENSION AND UNDERSTANDING OF A NEWS ARTICLE

CROSS-REFERENCE TO RELATED APPLICATION

This application claims the benefit of priority of U.S. provisional application No. 62/524,858, filed Jun. 26, 2017, the contents of which are herein incorporated by reference.

BACKGROUND OF THE INVENTION

The present invention relates to a system and method that derives a summary and a comprehension of a body of text and represents them as a neuronal network.

There are billions of texts, news articles reports, and information etc. on the Internet and in printed form. People need a way to get the summary of the information within a few or several sentences. People who have difficulty with comprehension also need a way to understand, decode and relate to the information being presented.

SUMMARY OF THE INVENTION

In one aspect of the present invention, a computerized system for modeling sentences within a distributed neural network for summarizing a body of text is disclosed. The system includes a computer having a user interface and a program product comprising machine-readable program code for causing, when executed, the computer to perform process steps. A first stem includes preparing the body of text via a preprocessor, the preprocessor configured to clean the body of text by converting one or more of a contraction, a hyphenated word, and an abbreviation to one or more words. The clean body of text is stored as a plain text representation of the body of text. With the plaint text representation as an input, determining a partial semantic for each sentence in the plain text representation. In a subsequent step, a lexical synset for each key word in the one or more sentences is determined, wherein the lexical synset identifies one or more nouns and one or more verbs in the sentence. A summary is then provided for the body of text based on the most frequently used lexical synsets. In some embodiments, the steps also include representing the lexical synsets as a distributed neural network.

The step of determining a partial semantic may include tagging at least each noun or verb part of speech with an identifier corresponding to the part of speech. The lexical synset may be grouped into one of a plurality of classes. The plurality of classes may include an action class, a collective class, a proper class, a common class, an abstract class, and a time class. Each of the plurality of classes are assigned a distinct color.

The step of representing the lexical synsets as a neural network may include defining a framework of the neural network by a source lexical synset and one or more lexical synset categories. The distributed neural network may then be constructed using the source lexical synset, and the one or more lexical synset categories, including an excitatory and an inhibitory postsynaptic potential. The lexical synset as a distributed neural may further network include the steps of determining a feedback to the source lexical synset; and constructing a comprehension of the body of the text.

Other steps include constructing an understanding component, configured to answer questions based on the comprehension of the body of the text. An index number dynamically assigned when the sentence is generated, the index number providing a location of the lexical words as well as a frequency of use of the lexical word within the one or more sentences These and other features, aspects and advantages of the present invention will become better understood with reference to the following drawings, description and claims.

BRIEF DESCRIPTION OF THE DRAWINGS

FIG. 1-1 is a continuation of FIG. 1.

FIG. 2-1 is a continuation of FIG. 2.

FIG. 2A-1 is a continuation of FIG. 2A.

FIG. 3-1 is a continuation of FIG. 3.

FIG. 3A-1 is a continuation of FIG. 3A.

FIG. 4 illustrates a neural network that answers the question "List one reason for the third world debt crisis."

FIG. 4-1 is a continuation of FIG. 4.

FIG. 5-1 is a continuation of FIG. 5.

FIG. 6-1 is a continuation of FIG. 6.

FIG. 8-1 is a continuation of FIG. 8.

FIG. 9-1 is a continuation of FIG. 9.

FIG. 10-1 is a continuation of FIG. 10.

FIG. 10A-1 is a continuation of FIG. 10A.

FIG. 11-1 is a continuation of FIG. 11.

FIG. 13-1 is a continuation of FIG. 13.

FIG. 14-1 is a continuation of FIG. 14.

FIG. 15-1 is a continuation of FIG. 15.

FIG. 16-1 is a continuation of FIG. 16.

FIG. 17-1 is a continuation of FIG. 17.

DETAILED DESCRIPTION OF THE INVENTION

Figure 1:
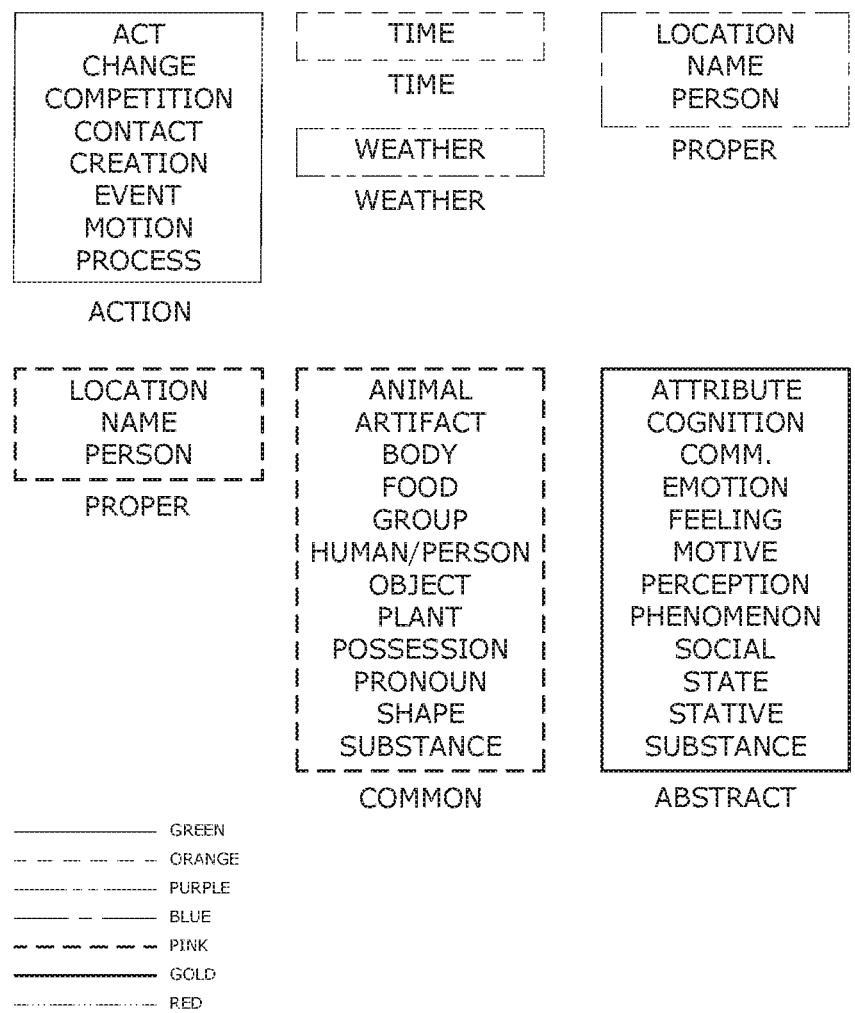
FIG. 1 illustrates a framework of a summary with words, parts-of-speech and lexical synset.
Figure 1:
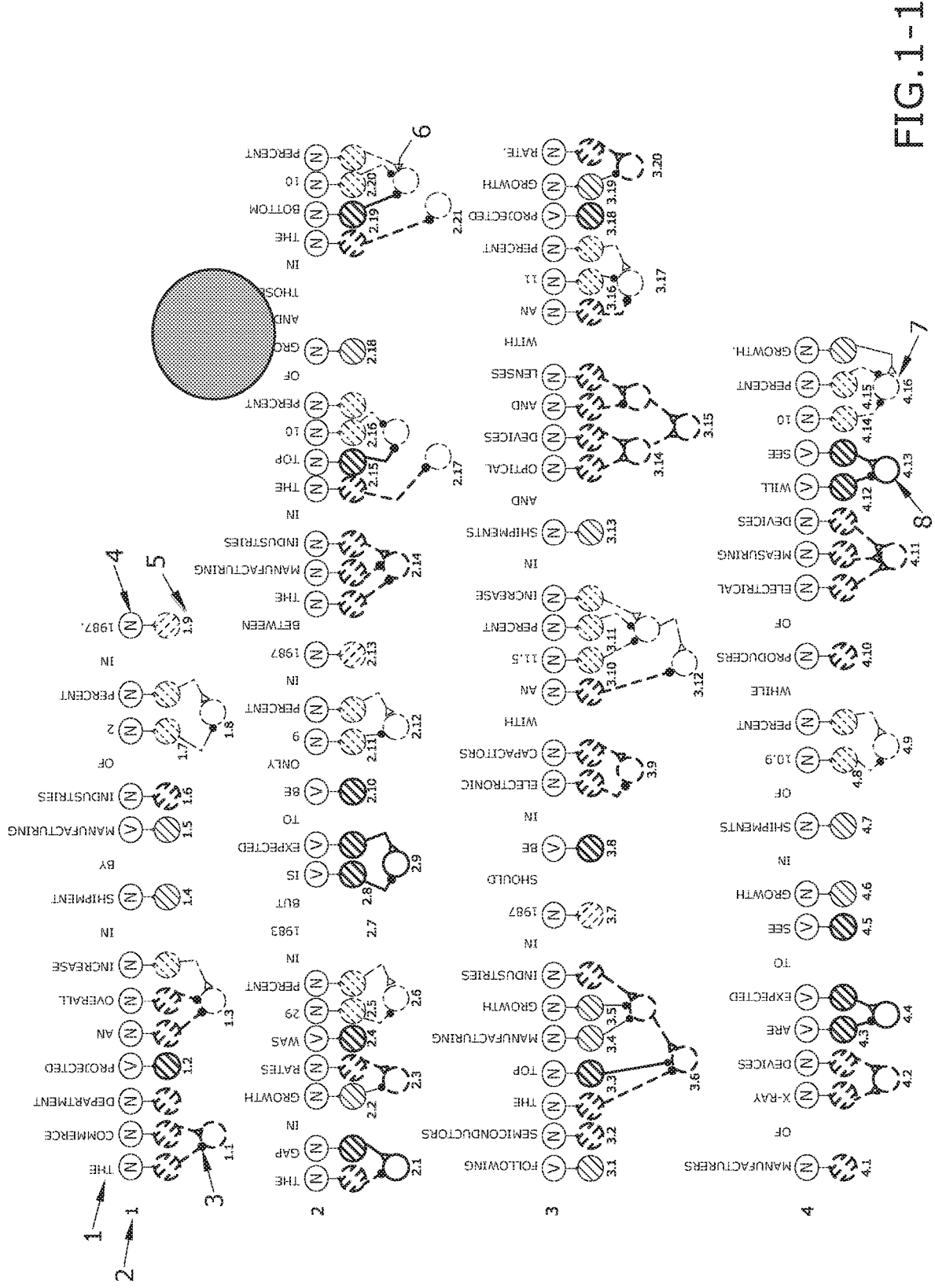

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved system, method, apparatus, and computer program product for The present invention relates to a system and method that derives summary and comprehension of text and represents them as a neuronal network or an output of the neural network.

There are billions of texts, news articles reports, and information etc. on the Internet and in printed form. People need a way to get the summary of the information within a few or several sentences. People who have difficulty with comprehension also need a way to understand, decode and relate to the information being presented.

As noted on the description below there is we have presented a preliminary diagram illustrating a system and method on how the brain hat derives summary and comprehension of text and represents them as a neuronal network.

The present invention includes a system and method that derives summary and comprehension of text and represents them as a neuronal network. The system and method is may be in the form of a software run on a computer. The software prompts the computer to derive a summary of text and the output creates a model of how the human brain might interpret the text as a neuronal network. The neuronal network then shows the comprehension of the text.

The system and method of the present invention not only summarizes the text, report, news articles etc. but also outputs a model of how the text might be represented in the human brain. The model output also highlights one or more key words associated with the text for the purpose of comprehension. The output from the system can be used by an educational system for early childhood diagnosis associated with reading comprehension, intelligent agent, system or robot to understand text.

Referring now to Figures, the present invention includes a software run on a computer, the software including the capability to:

1. Prepare Text: The text to be summarized is obtained and provided as an input into a preprocessor. The preprocessor that prepares the text for the system. The preprocessor extracts the sentences from, for example, an xml file and then performs one or more tasks. Some tasks involve fixing contractions, hyphenated words and abbreviations as well as removing the periods and currency symbols, such as dollar signs from monies. The prepared news article text is stored to disk to be processed by the program that determines the semantics. The preprocessor also attempts to find one or more proper nouns and place them in separate file.

2. Determine a Partial Semantic of a Sentence: The output of the preprocessor is the input to the partial semantic program. This program module outputs a partial semantic for every sentence using a part-of-speech tagger and parser on every sentence. This program may use an ASCII character to represent a part-of-speech (example table=noun=n) where n is a noun. By using an ASCII character, it is easier to count the number of noun and verbs in the sentence.

3. Determine The Lexical Synsets: for key words in the sentences: the output of the partial semantic program is the input to the lexical synsets program.

4. Summarize The News Article: The output of the lexical synsets program is the input to a summarizer program module that summarizes the news articles. This program module outputs the summary for the news article using the lexical synsets and partial semantics. The system first determines the most frequently used lexical synsets in the news article. Then it uses these words to determine which sentences to extract for the summary.

5. Output prints out the lexical synsets for the summary sentences to be represented as a neuronal network: the output of the summarizer is the input to the program that creates the model for the neuronal network which will show the comprehension.

These programs use a part-of-speech tagger, a parser, and a name entity recognition software. By way of non-limiting example the part-of-speech tagger may be provided by the Stanford Natural Language Processing Group, WordNet software from Princeton University. Alternatively, the Monty Lingua part-of-speech tagger from MIT may be used. The system may also use a lexical synset processing, such as the WordNet (Miller, 1995 and Fellbaum, 1998) software to determine the lexical synset for key words in the sentence.

The Component that determines the lexical synsets for key words in the sentences. This program outputs the lexical synsets for every noun and verb in the sentences.

The computer programs can be used as an App or an online application to generate and compute the summary and comprehension of the text. The computer program could also be used by an educational system for early childhood diagnosis associated with reading comprehension, intelligent system or robot to summarize and comprehend text as well as sentences. The computer program could be used in research to show how text might be represented in the human brain. The output of the computer program can be used by researchers to show how various diseases affect language comprehension. The computer programs can be used as an App or an online application to compute the summary and comprehension of the text. The computer program could also be used by an intelligent system or robot to summarize and comprehend text as well as sentences. The computer program could be used in research to show how text might be interpreted or presented in the human brain. The output of the computer program can be used by researchers to show how various diseases and neural miscommunication can lead to or affect language comprehension.

The model consist of a set of six steps to determine comprehension and understanding for the news articles. This application will present comprehension and understanding for only nine news articles. Each content word in this model have properties that include a part-of-speech and a lexical synset that feedforward to its lexical synset category where the lexical synset category feedback to the content word in the sentence. Lexical synset is discussed in Step 2.

The network model includes neurons, dendrites, and axons. If the sentence contains a subordinate clause FIG. 4, 4-1 (element 22), then the output from the axon not only feedback to the original word (element 19) but also feedforward as input to the subordinate clause which is a separate neuron. The output or axon of the subordinate clause then points to the neuron that is at the beginning of the clause (element 21).

A set of computer programs was developed to determine the summary for the news article. Another set of software computer programs were used to construct a model of a neural network using summary sentences from news articles. The software program does not create the diagrams for the neural network. The software program generates the data that will be used to create the neural network diagrams.

The model demonstrates how a summary from a news article might be represented as a distributed neural network and process to determine comprehension. The summary sentences are a subnetwork informed by syntactic and semantic theories as well as cognitive synonyms (lexical synset). Cognitive synonyms (lexical synset) help determine the keywords to identify the summary sentences.

The words in the sentences of the news article are the neurons of the neural network, while the axons from the neurons are inputs (dendrites) to the lexical synset category using the feedforward projection. The axons from the lexical synset category feedback to the lexical synset. The comprehension is based on the key lexical synset as well as the most frequently used lexical synset. Sentences with more lexical synset have more information than sentences with fewer lexical synset. Therefore this model demonstrates multiple feedback projections which are necessary for comprehension of news articles.

Figure 2:
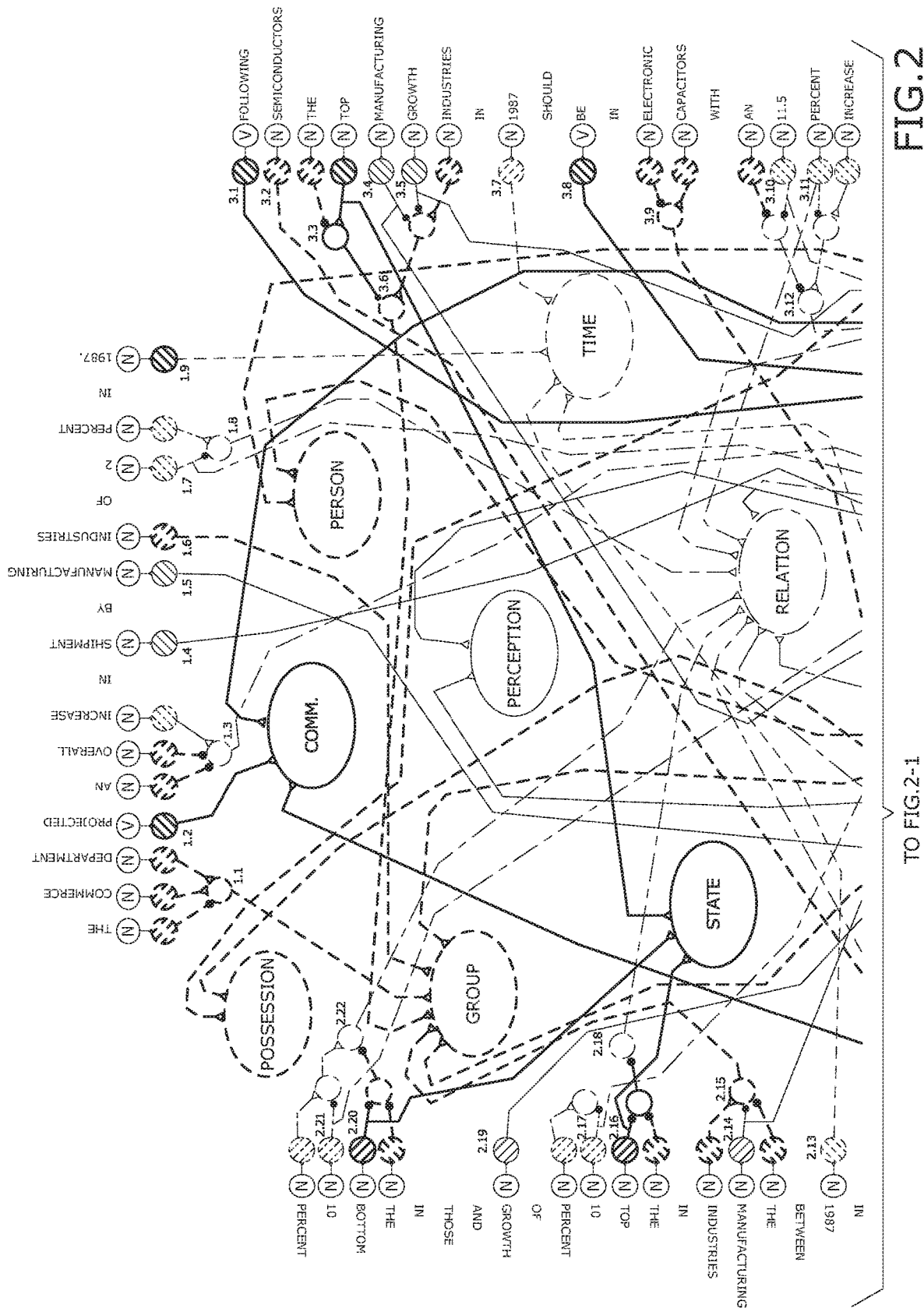
FIG. 2 illustrates the summary sentences represented as a neural network.
Figures 1, 2:
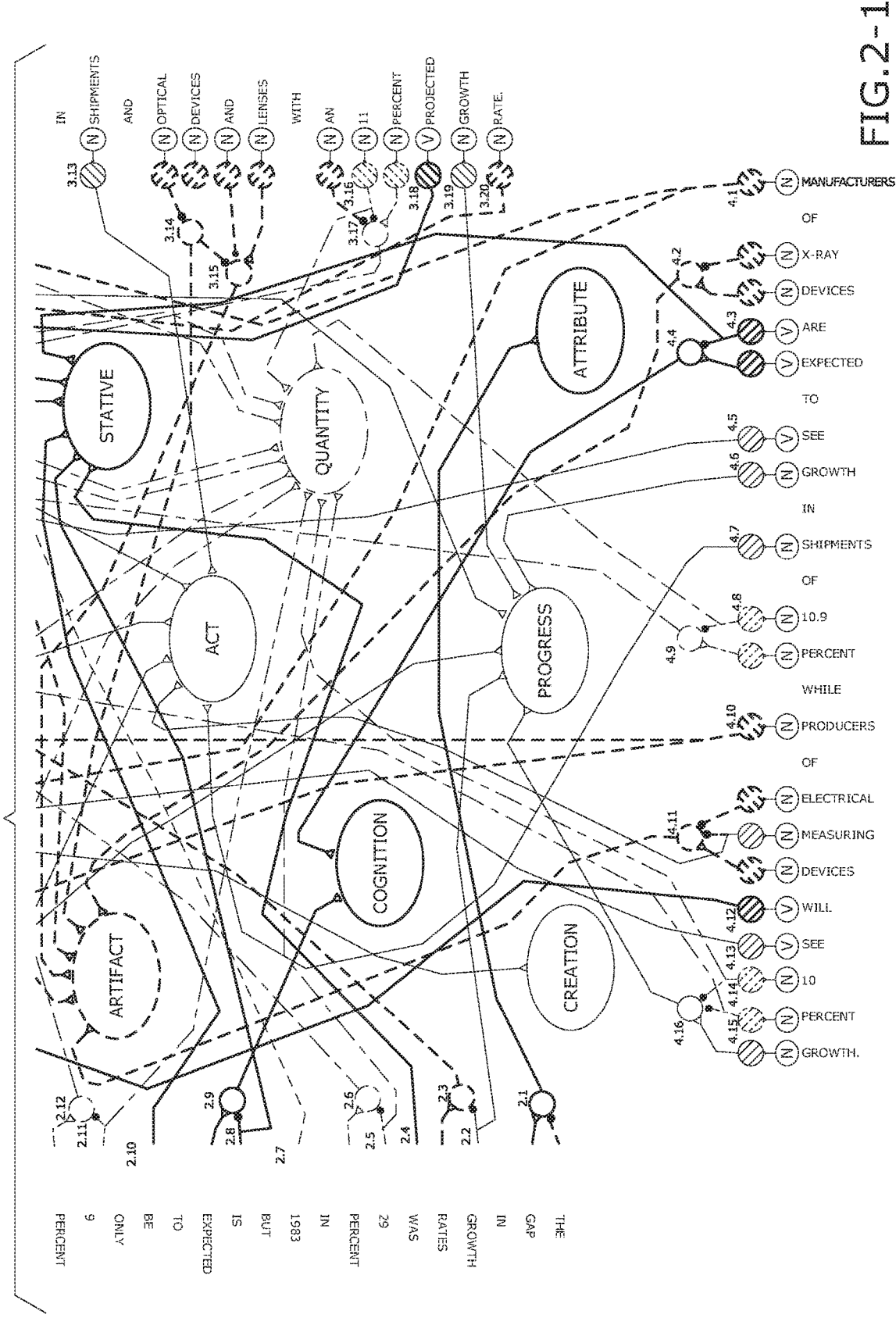
Figure 2A:
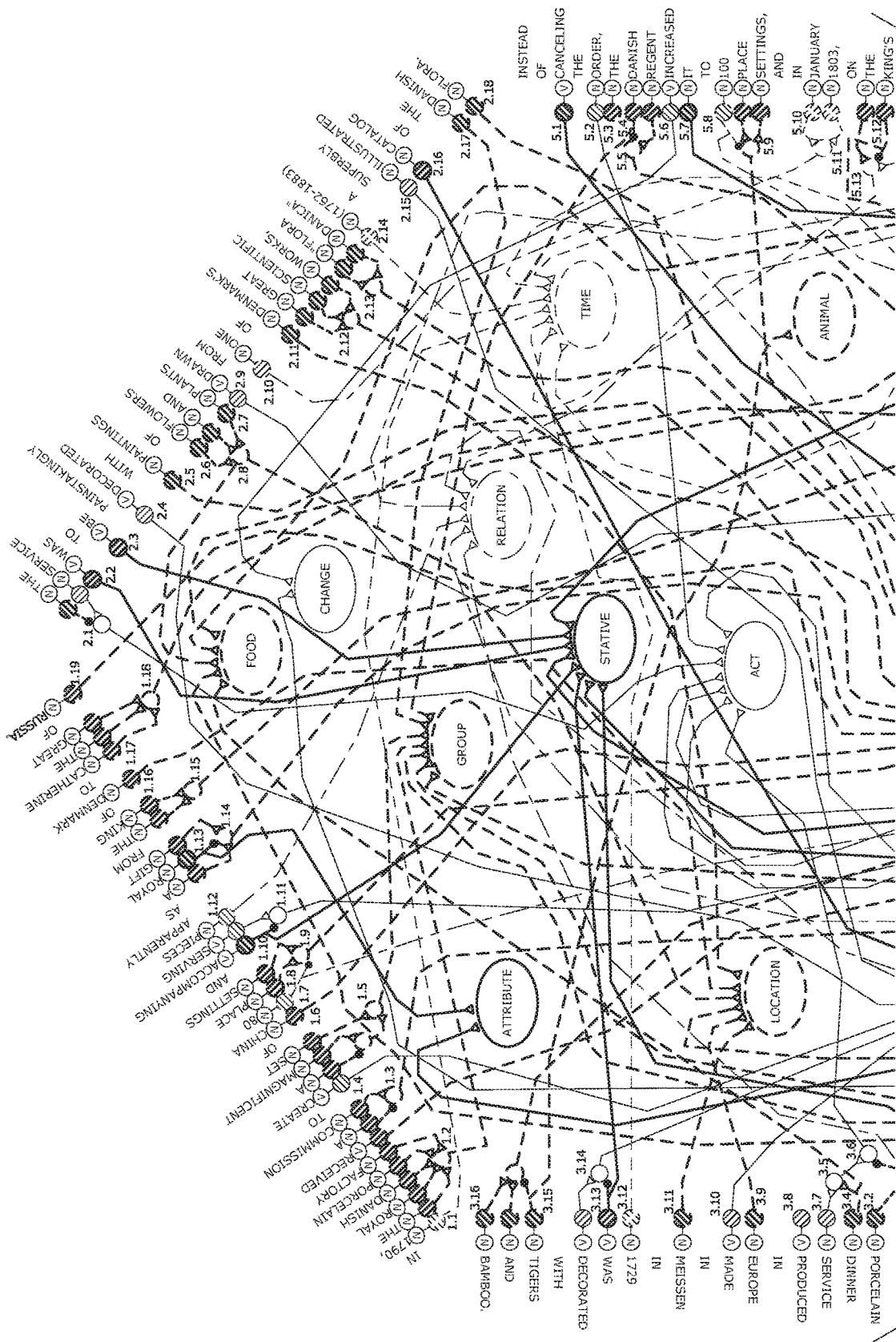
FIG. 2A illustrates the summary sentence represented as a neural network.
Figure 2B:
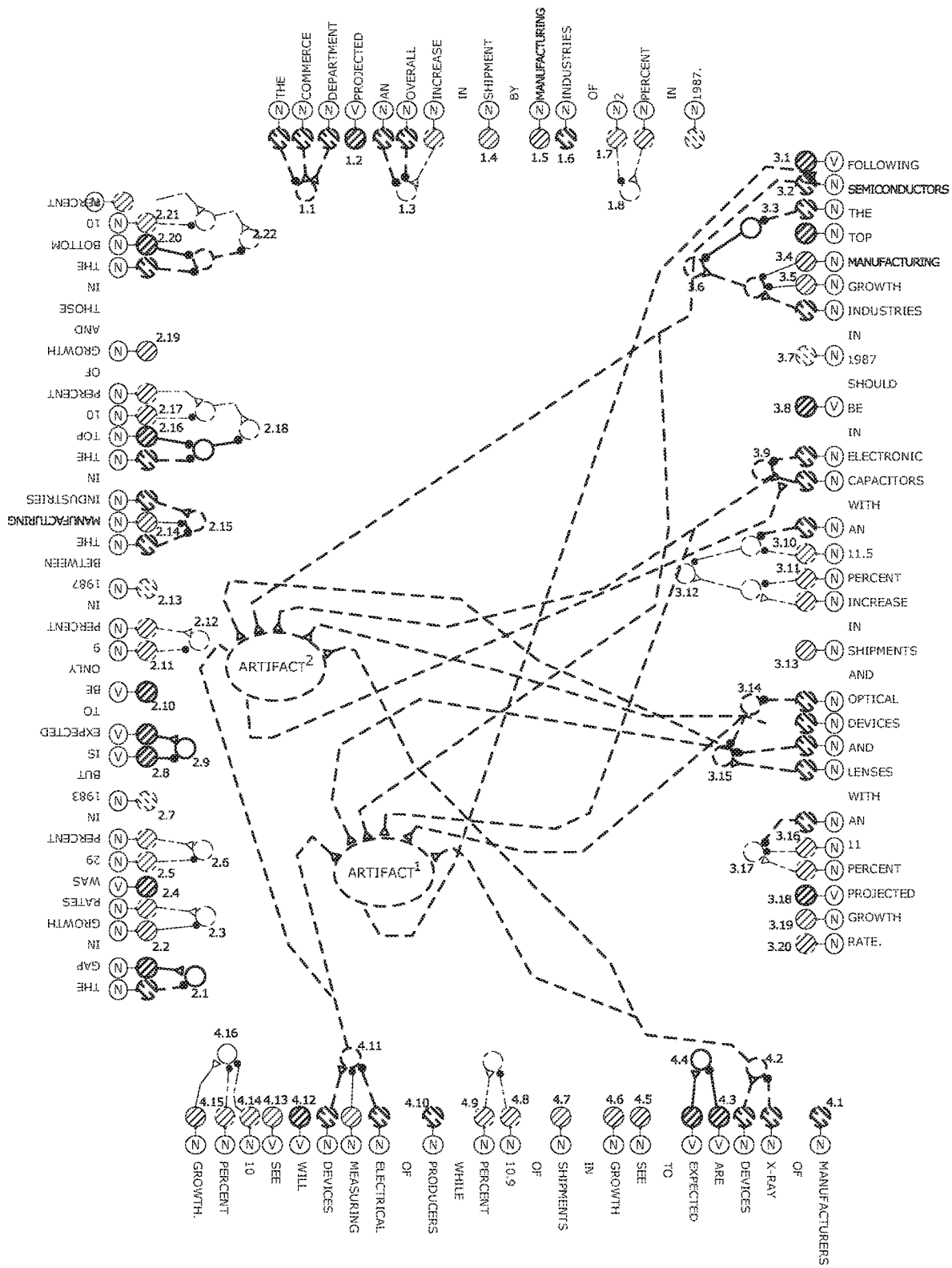
FIG. 2B illustrates the frequent lexical synset category artifact with feedback to shipments$_{1.4}$ and semiconductor$_{3.2}$.

FIG. 2B shows multiple feedback for the lexical categories artifact and creation respectively. In FIG. 2B there are six artifact in the news article. The artifact[1] feedback to the word semiconductor$_{3.2}$ while artifact[2] feedback to the word electronic capacitors$_{3.9}$. Understanding is based on the answers from the questions from the original summary sentences.

One finding of this model is not only might the neurons count the part of speech to determine semantic but also count the lexical synset as well as the most frequently used words in the news articles. Another finding for this model is that each word in the sentence may be provided an index number. This index number is dynamically assigned when the sentence is generated. The index number is used to locate the lexical words as well as the frequently used words and phrases used within the sentences. The results suggest that axons are not only used for output but for pointing to another neuron as well.

As comprehension takes place more lexical synset categories (neurons) are added to represent multiple feedback to a specific lexical synset. A filtering structure that synthesize sentences into a reduced format in order to determine comprehension is another discovery for this model.

Language is complex since its components must be processed on multiple levels simultaneously. For comprehension to take place the words, part of speech and its lexical value must be correctly interpreted. It involves word, sentence and lexical processing that takes place in parallel so that comprehension can take place. If previous knowledge is to be included that must be processed along with the comprehension. Using non-linear summation, the neurons seem to count the part-of-speech, lexical synset and most frequently used words simultaneously or in parallel and sequentially to derive a comprehension of the news article.

The processing of language takes place in a multiple dimensional space; however, this model will show it in a two-dimensional space. Preposition and adverb does not play a key role in determining the comprehension and semantic (Mitchell, 2015), however they play an important role in understanding of text. The model demonstrates the techniques using examples from news articles.

The Natural Language Processing Program.

A set of natual language processing programs was used to output one or more summary sentences for the news articles. There are five natural language processing programs that are used in this neural network model.

I developed a set of natural language processing programs that inputs text from the New York Times corpus and outputs the partial semantic, summary and a model for the neural network. These programs use the a part-of-speech tagger, parser, and a name entity recognition software from the Stanford Natural Language Processing Group. In addition, I used the MontyLingua part-of-speech tagger from MIT. The programs are object-oriented and the programs are written in C++ and run under the Windows operating system on a workstation.

Figure 18:
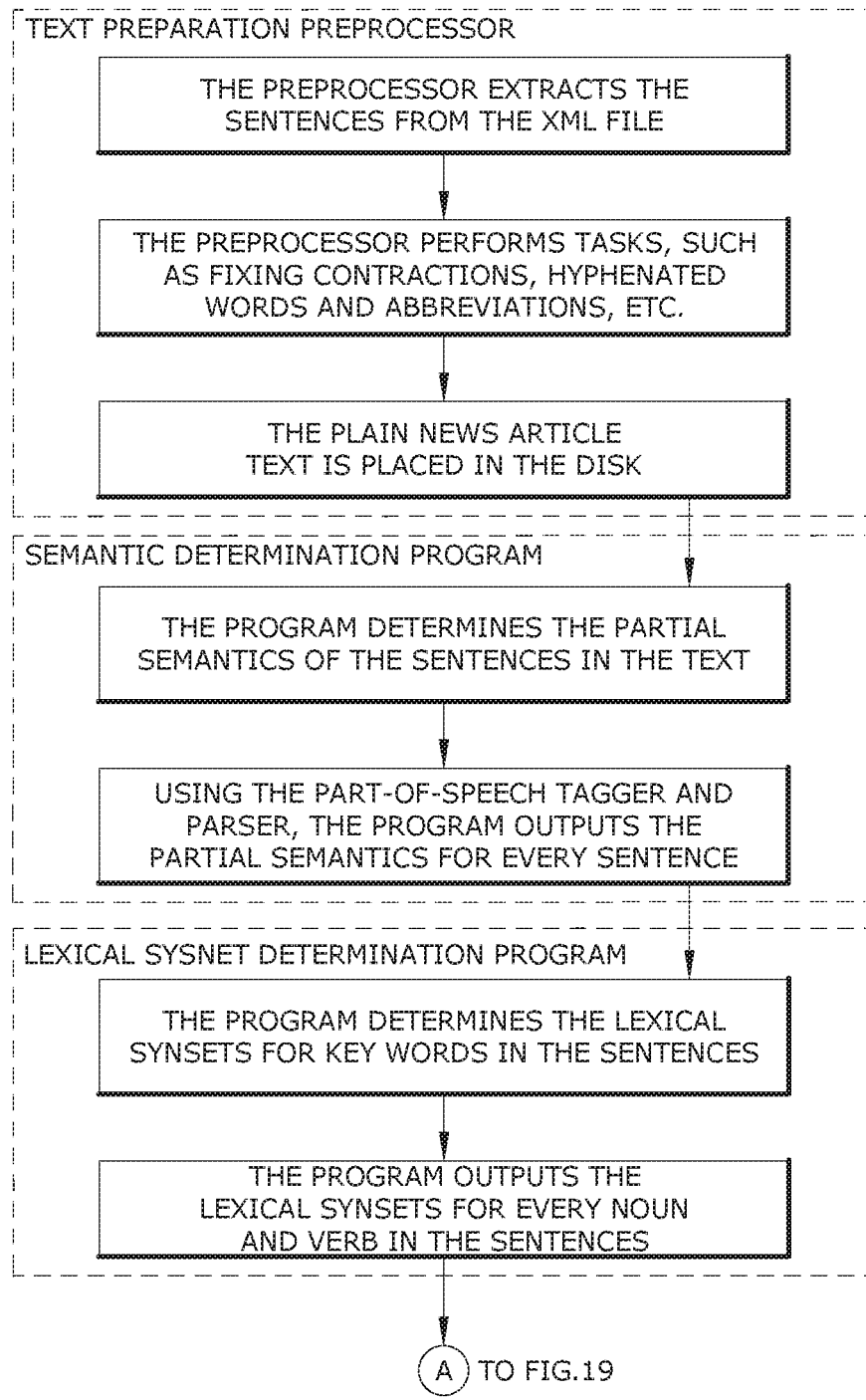
FIG. 18 illustrates a flowchart for preparation of a summary of a body of text and a neural network.
Figure 19:
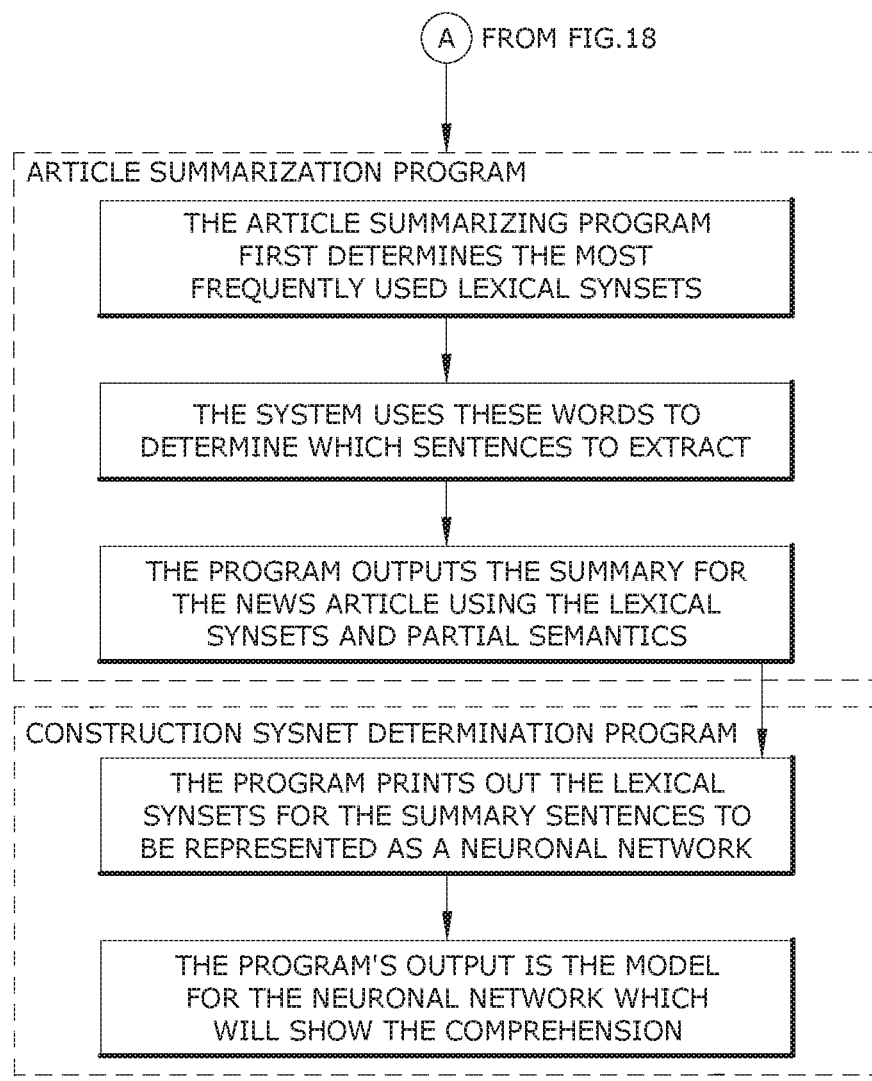
FIG. 19 illustrates a continuation of the flowchart of FIG. 18.

As seem in reference to FIGS. 18-19, the computerized system includes five natural language processing components, including a preprocessor component; a partial semantic component; a lexical synset component; a summarizer component; and a neural network construction component.

Preprocessor Component.

The preprocessor component extracts the sentences from a body of text, such as an xml file and then perform several tasks. Some task involved fixing contractions, hyphenated words and abbreviations as well as removing the periods and dollar signs from monies. The plain news article text is placed in the disk to be processed by the partial semantic component. The preprocessor also tries to find the proper nouns and place them in a separate file.

Partial Semantic Component.

The partial semantic component outputs the partial semantic for every sentence using a part-of-speech tagger and a parser on every sentence. This partial semantic components tags the words in the sentence with an identifier for the parts of speech. For example, the identifier may be an ASCII character to represent the part-of-speech (example table=noun=n) where n is a noun. By using ASCII character, it is easier to count the number of noun and verbs in the sentence.

Lexical Synset Component for Key Words in the Sentences.

The lexical synset component determines the lexical synset for key words in the sentences, for example by using WordNet from Princeton University.

The summarization technique presented may also use a sentence-extraction methods where the summarization is then a condensed version of the original news article. The MAYA Summarizer determines the keywords for each news article and then uses them to construct a summary. This program outputs the lexical synset for every noun and verb in the sentences.

Article Summarization Component.

Summarizes the news articles using the lexical synset and the partial semantics.

This program output the summary for the news article using the lexical synset and partial semantics. The system first determines the most frequently used lexical synset in the news article. Then it uses these words to determine which sentences to extract for the summary.

Neural Network Construction Component.

A program that outputs the lexical synset that will be used to construct the neural network for the summary sentences. A program that outputs the lexical synset for the summary sentences that will be used to create the distributed neural network. Example of the output for this program is given below. It shows the word, lexical synset and the position within the sentence. This output will be used to create the distributed neural network, which may be utilized to determine a comprehension and an understanding the News Article, according to the following process steps:

Step 1: Determine the summary for the news article.

Step 2: Develop a framework for the neural network which includes the lexical synsets and lexical synsets categories.

Step 3: Construct the distributed neural network using the lexical synset, lexical synset categories along with the excitatory and inhibitory postsynaptic potential.

Step 4: Determine the feedback to the source lexical synset.

Step 5: Show a comprehension of the news article.

Step 6: Construct the distributed neural network to answer questions related to the news article.

Examples of implementing aspects of the invention are provided through the following non-limiting examples of a body of text, which were taken from news article from the New York Times Corpus, (Sandhaus, 2008):
Technology Seen As Top Sector http://www.nytimes.com/1987/01/02/business/technology-seen-as-top-sector.html
Trade Talks Stall on Farm Issues http://www.nytimes.com/1990/10/22/business/trade-talks-stall-on-farm-issues.html
When Europe's Flora flourished on Porcelain http://www.nytimes.com/2002/01/06/nyregion/cuttings-when-europe-s-flora-flourished-on-porcelain.html
States on Twisted Path To Weaker Tobacco Pact http://www.nytimes.com/1998/10/14/us/states-on-twisted-path-to-weaker-tobacco-pact.html
AN ERA OPENS AS SCIENTISTS REPRODUCE DRUGS MADE IN THE BODY http://www.nytimes.com/1987/06/16/science/an-era-opens-as-scientists-reproduce-drugs-made-in-the-body.html?pagewanted=all
The Snake Oil Diet http://www.nytimes.com/1987/08/10/opinion/the-snake-oil-diet.html
Doctors Reap Millions for Anemia Drugs http://www.nytimes.com/2007/05/09/business/09anemia.html
Many Utilities Call Conserving Good Business http://www.nytimes.com/2001/05/11/us/many-utilities-call-conserving-good-business.html?mcubz=0
PERSONAL HEALTH http://www.nytimes.com/1987/05/13/garden/personal-health-249187.html
Step 1 Determine the Summary for the News Article.

The summary sentences are generated from the software programs listed above. An automatic summarization program named the MAYA Summarizer was developed to use the keywords in the news article for topic identification. The steps for the automatic summarization is as follows (1) determine the partial semantics for each sentence in the news article using the MAYA Semantic Technique (2) extract the keywords from the subject and object part of the partial semantics (3) determine the frequency of each keyword in the article (4) an extract-type summary is constructed based on the keywords with the highest frequencies. The MAYA Summarizer outputs several summaries of a particular news article. One particular summary uses the partial semantics of sentences. Therefore, the summary sentences include the original sentences and sometimes a shorter version of the sentences.

FIG. 1-1 (element 2) shows the position of the sentence within the summary for the news article. The summary used for the technology news article has five sentences.

The following description provides the system operation to obtain the summary sentences for the following body of text, a news article:

The Commerce Department projected an overall increase in shipments by manufacturing industries of 2 percent in 1987. The gap in growth rates was 29 percent in 1983 but is expected to be only 9 percent in 1987 between the manufacturing industries in the top 10 percent of growth and those in the bottom 10 percent. Following semiconductors, the top manufacturing growth industries in 1987 should be in electronic capacitors, with an 11.5 percent increase in shipments, and optical devices and lenses, with an 11 percent projected growth rate. Manufacturers of X-ray devices are expected to see growth in shipments of 10.9 percent, while producers of electrical measuring devices will see 10 percent growth.

Figure 1A:
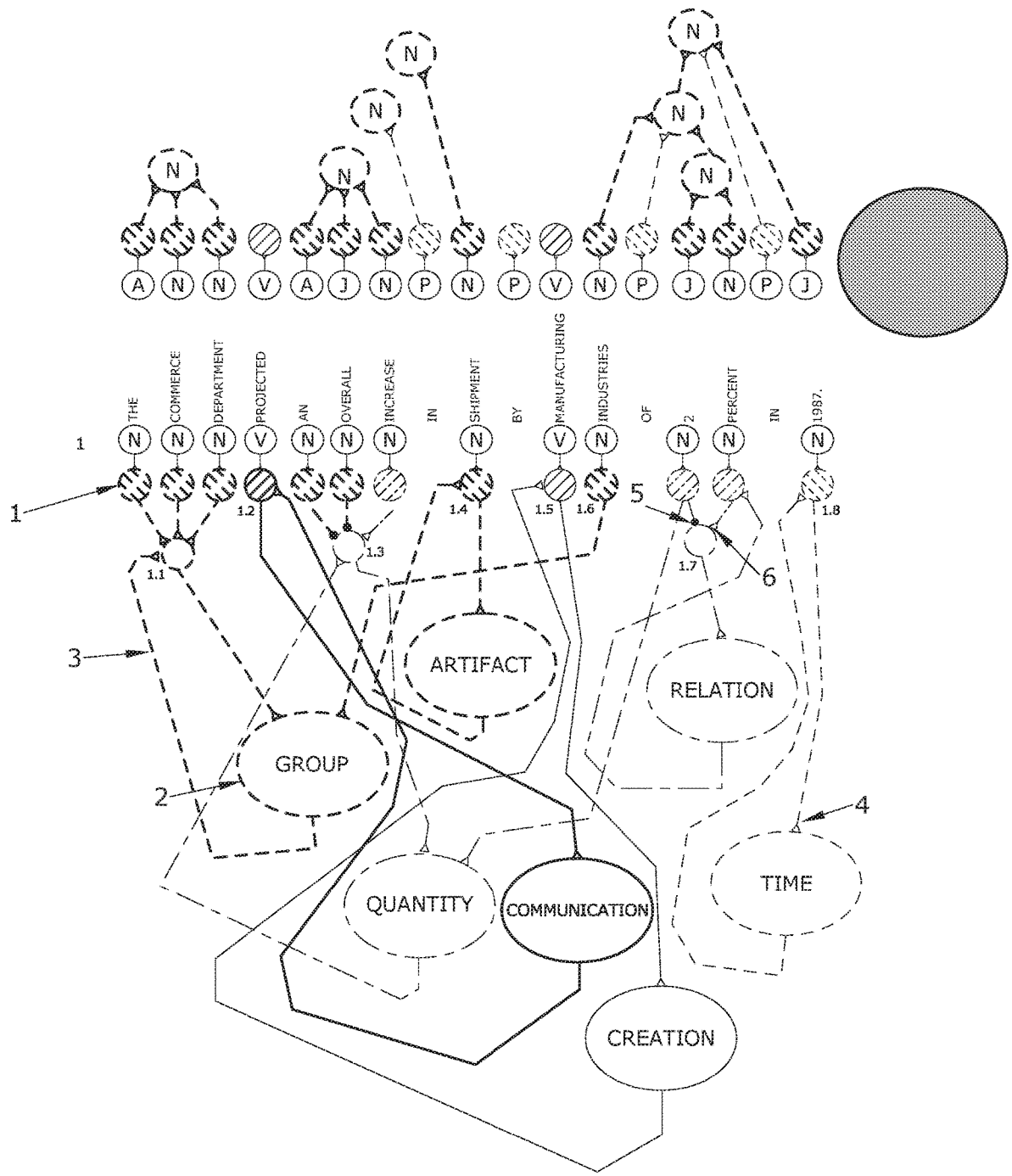
FIG. 1A illustrates a neural network of a first sentenced in the summary with a verb noun repeating pattern.

Step 2 The framework for the distributed neural network which includes the lexical synsets and lexical synsets categories (FIG. 1A).

The summary will be used to construct the framework for the neural network using WordNet from Princeton University (Miller, 1995 and Fellbaum, 1998) using a lexicon. The framework consist of the words in the sentences along with its part-of-speech and its lexical synset. WordNet is a large lexical database for English words. "Nouns, verbs, adjectives and adverbs are grouped into sets of cognitive synonyms (synsets), each expressing a distinct concept. Synsets are interlinked by means of conceptual-semantic and lexical relations" (Miller, 1995 and Fellbaum, 1998).

The present application will refer to the cognitive synonyms as a lexical synset. Lexical synset are typically only provided for noun and verb parts-of-speech and sometimes for adjectives. The parts-of-speech and the lexical synset are properties of the word/neuron. While lexical synset categories are neurons.

FIG. 1A shows the lexical synset (element 1) that are feedforward to the lexical synset category (element 2). The lexical synset category exhibits a feedback FIG. 1A (element 3) to the individual lexical synset. The content words are used to create the lexical synset. The lexical synset are grouped into a plurality of classes. Each class is given a color, such as Action class may be colored green, while the Collective class may be show in in blue the Table 1. The Proper and Common classes have lexical synset categories that are either nouns or verbs. The word had is a verb and its lexical synset is possession which is part of the Common class. The lexical synsets in the Collective and Time classes are all nouns. Not all the lexical synsets in the Action class are verbs and not all lexical synsets in the Abstract class are nouns.

FIG. 1-1 shows the summary of the news article with its lexical synset. The summary sentences in FIG. 1-1 depict the words (element 1), part-of-speech (element 4) and the lexical synset. The lexical synset may be represented as colors. For example, orange may represent time, whereas blue might represent either a quantity or a relation. The sentence also shows the noun phrases (element 7) as well. Commerce Department, 2 percent, and 10 percent growth (element 7) are also a noun phrase. The index number (element 5) shows the line number and the position within the sentence. The index number for example 1.3 (increase which is a relation), where 1 is the first summary sentence and 3 is the third lexical word within the sentence.

In FIG. 1-1 2 percent is a noun phrase. Where 2 is an adjective and percent is a noun. The lexical synset for the noun phrase is quantity relation. Since the two words are combined to form a single noun phrase, but each has a different lexical synset. In FIG. 1-1 the 2 will have an inhibitory postsynaptic potential (element 5) since its sum will not be included with the lexical synset relation. The noun and verb in the sentences either have an excitatory or an inhibitory postsynaptic potential. The inhibitory postsynaptic potential is depicted as a circle (element 3), while the excitatory postsynaptic potential is represented as a triangle (element 6). The inhibitory postsynaptic potential does not contribute to the summation as does the excitatory postsynaptic potential. Lateral excitation might be used to group the noun phrases within the sentence. The lexical synset are feedforward to the lexical synset category as in FIG. 1A (element 1).

Connection to the lexical synset categories are always excitatory postsynaptic potential as seen for example in FIG. 1A (element 4). In FIG. 1A a separate dendrite (element 5) leads from the 2 axon to the quantity lexical synset category. Usually, index number are given for only lexical synset. Therefore in FIG. 1-1, the word gap which is an attribute has an index number of 2.1, while the word The does not have an index number because it is an article therefor it is given a basic color, such as pink since pink was used for noun phrases (Mitchell, 2015). The noun phrase in the sentences that contain the lexical synset does not include prepositional phrases.

Figure 1B:
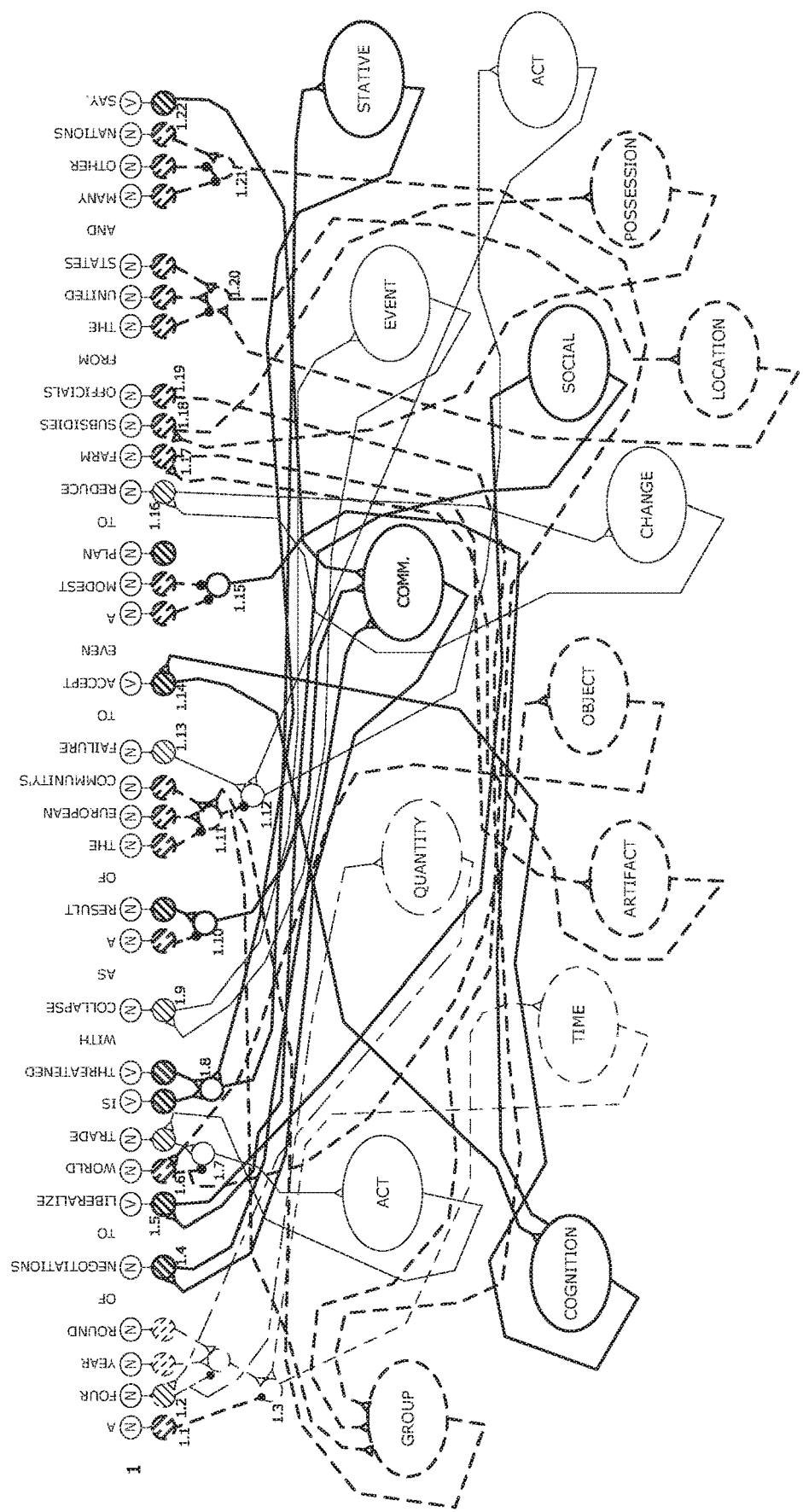
FIG. 1B illustrates a neural network for the first sentence in the summary with lexical synset categories.

In FIG. 1B the noun phrase contains article, adjective, conjunction and nouns. In this model, the number of lexical categories for the first sentence range from six to fifteen or more. The first sentence of the news article that has fifteen lexical synset categories contains a lot of information about the news article than one that contains fewer. FIG. 1A shows the first sentence in the summary along with its noun verb repeating pattern (top), the lexical synset and lexical synset category (bottom). FIG. 1A shows both feedforward from the lexical synset to the lexical synset category as well as feedback from the lexical synset category to the lexical synset. FIG. 1A is the first sentence of the news article. FIG. 1B shows the first sentence of a news article that have fifteen lexical synset categories. In this model, the number of lexical categories for the first sentence range from six to fifteen or more. The first sentence of the news article that has fifteen lexical synset categories contains a lot of information about the news article than one that contains fewer.

Neurons dendrites and axon have three possible functions. Neurons can be used for input, output and pointing. The feedback can be used to point to a specific neuron or it can be used as an input to that neuron. An output (axon) from a neuron can be used as an input to another neuron or it can be used to point to a neuron.

Step 3 Determine Comprehension and Understanding for the News Article.

Construct the distributed neural network using the lexical synset, lexical synset categories along with the excitatory and inhibitory postsynaptic potential (FIG. 2).

The framework from Step 2 are used to construct the distributed neural network. The neural network is composed of all the summary sentences where the lexical synset feedforward to the lexical synset categories. Step 3 is the actual construction of the neural network which shows the convergence zones where the lexical synset project in a feedforward manner to the lexical synset categories. The network model in FIGS. 2, 2-1, and 2A, 2A-1 support dynamic creation of neural network that represents the summary for the news article. The software program creates the data for the neural network. However, the actual diagram of the distributed neural network is created manually using Adobe Illustrator at this time. The summary sentences are used to construct the network graph or diagram along with the lexical synset, lexical synset category as well as dendrites and axons that form a cognitive representation of comprehension. The axons from the lexical synset become input (dendrites) to the lexical synset category. The dendrites (input) to the lexical synset category are projected in a feedforward manner.

While, the axon from the lexical synset category project back to the key lexical synset which will be used to construct the comprehension. Here the summary sentences are used to create a subnetwork with its dendrites (feedforward to the lexical synset category) and axons (feedback to the key lexical synset). Simple versions of the distributed neural network are presented in this paper. An actual distributed neural network would require more neurons. I kept it simple by showing only one lexical synset category within the neural network. For example in FIG. 2 there should be three communication, nine relation, six group and six act lexical synset categories. Since each lexical synset must have a feedback from the lexical synset category to its source it would require multiple lexical synset categories. I also did not show any feedback to the individual words in the sentence within the distributed neural network in order to keep the model simple.

Step 4 Determine Comprehension and Understanding for the News Article.

Determine the feedback to the source lexical synset.

Figure 3:
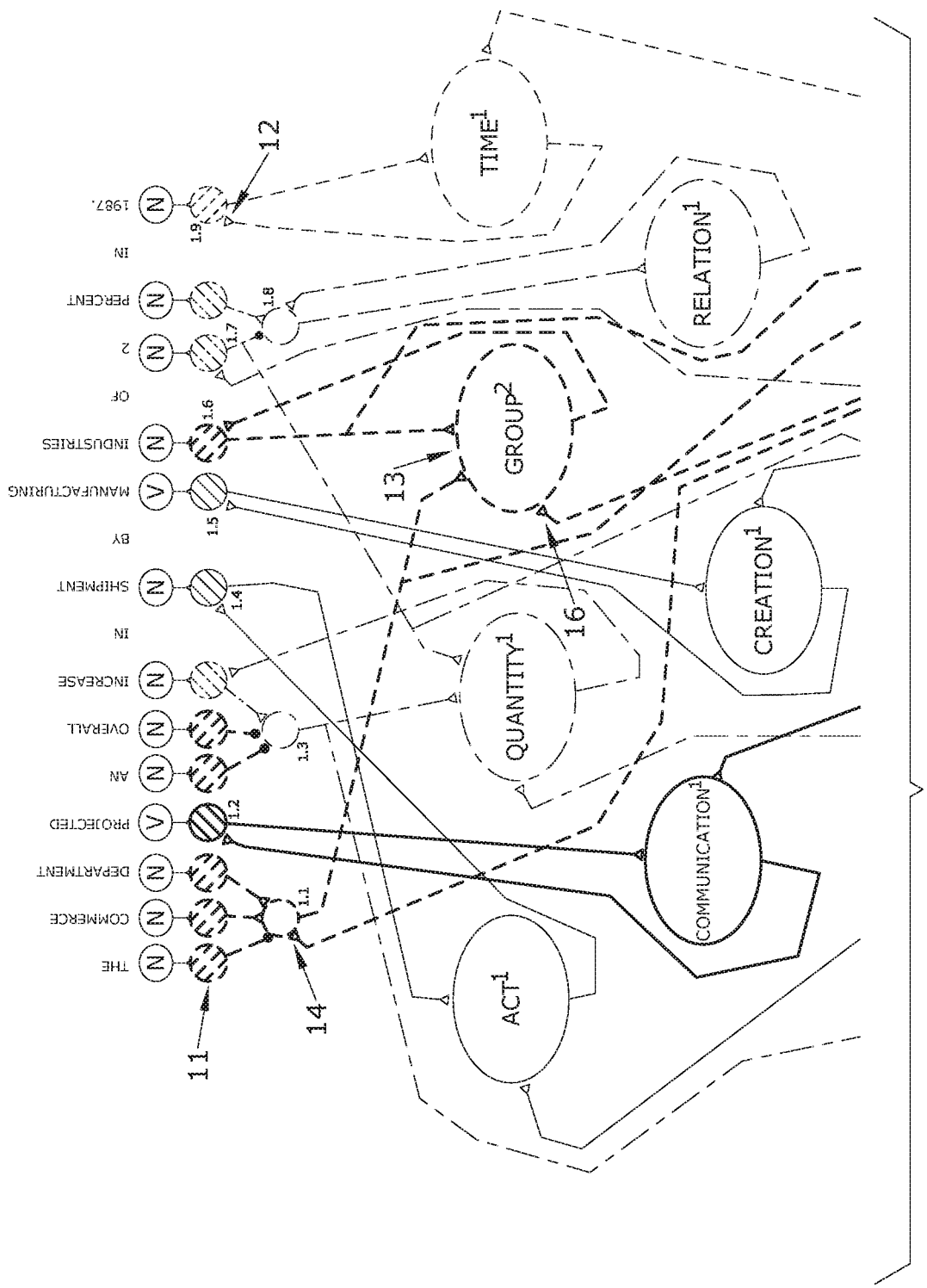
FIG. 3 illustrates a neural network that answers the question "What was the project increase in shipments by manufacturing industries for 1987?"
Figures 1, 3:
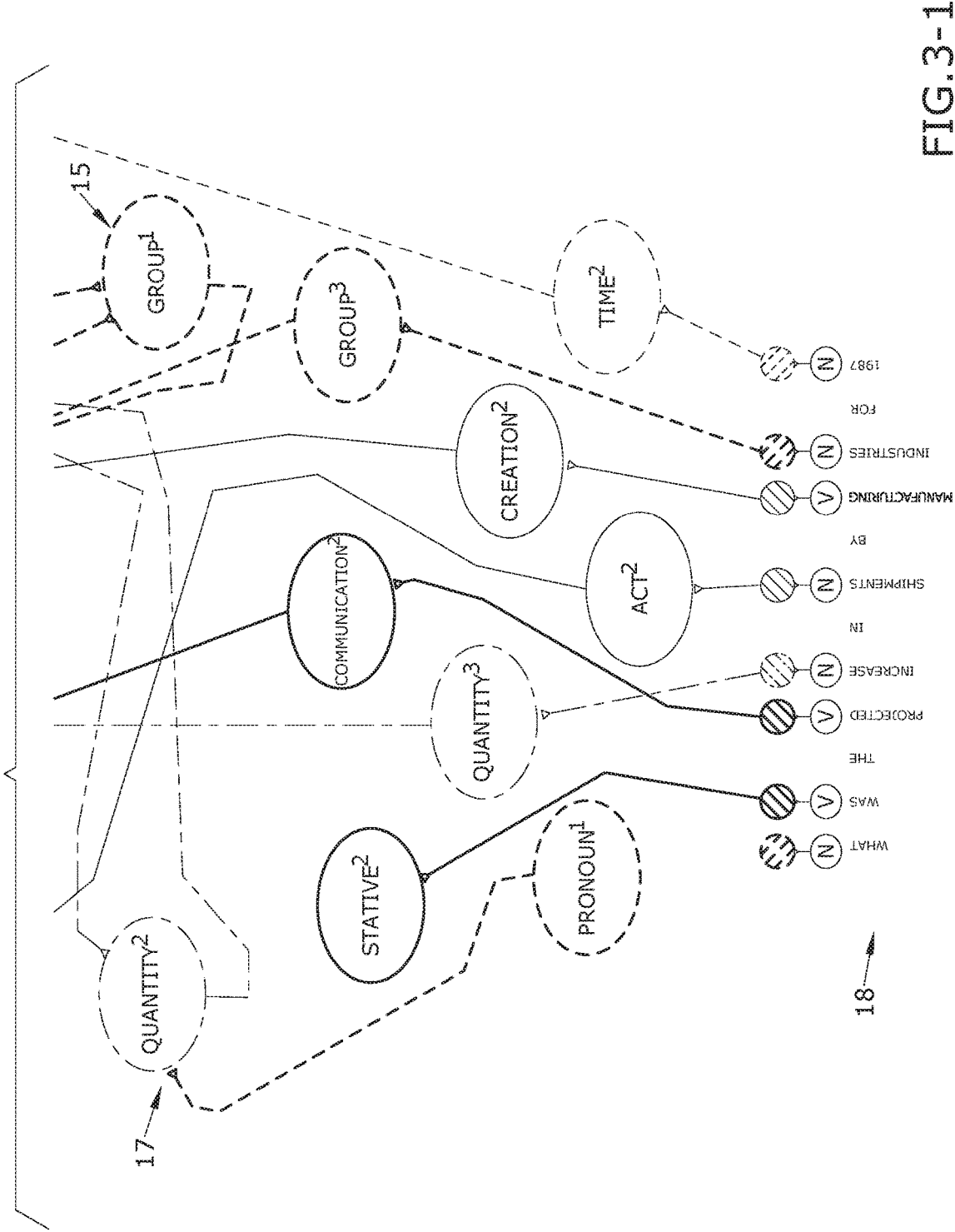

The feedback points to the data that will be given attention in the comprehension and the understanding. All neurons feedback from the lexical synset categories to itself. But only the ones that fires are the neurons that will be given attention and for our purpose will be noted with a black postsynaptic connection (FIG. 3 element 12). This model does not focus on non-content words such as preposition and adverb at this time.

Step 5 Determine Comprehension and Understanding of the Article.

The comprehension of the news article may be shown in reference to Table 4 and Table 5.

The comprehension is composed of the first occurrence and/or the most frequently used words in the news article. The frequently used content words are determined by the natural language processing program. Tables 4 show the words in the comprehension with its associated index number. While Table 4a shows the lexical synset with its associated superscript number. Hence, the words pointed by the feedback within the lexical synset and the most frequently used words in the summary sentence are used to construct the comprehension for the news article.

The first sentence in the news article usually has the most feedback since it contains a lot of key words in the news article. The words used to construct the comprehension for the summary of the news article is based on the neuron that is pointed to by the feedback. For example in Table 4 under the lexical synset category act the word shipments$_{1.4}$ is the first frequently used word in the act category. While the word manufacturing$_{3.4}$ (noun) is just a frequently used word within the act category. Note that the word manufacturing is used as a noun as well as a verb in the summary. The word manufacturing$_{1.5}$ is listed as a verb in the lexical synset category creation. In the paper (Mitchell, 2015) all nouns were given the color pink while all verbs were given the color green.

| Words | Commerce Department$_{1.1}$ | projected$_{1.2}$ | increase$_{1.3}$ | shipments$_{1.4}$ | 1987$_{1.9}$ |
|---|---|---|---|---|---|
| Lexical synset | group | communication | quantity | act | time |
| Part-of-speech | noun | verb | | noun | |

Comprehension = Commerce Department$_{1.1}$ + projected$_{1.2}$ + increase$_{1.3}$ + shipments$_{1.4}$ + 1987$_{1.9}$

= group$^1$ + communication$^1$ + quantity$^1$ + act$^1$ + time$^1$

In Table 4a act$^1$ is used to denote shipments$_{1.4}$, while act$^2$ is used to denote manufacturing$_{3.4}$ in the equations. Distributed neural network that creates sentences based on the index number of the neuron in the network and the category of the neuron to form a verb-noun repeating pattern. Large news articles then to have multiple frequent lexical synset. The key lexical synset for the summary that are pointed to by the feedback. These key lexical synset that will be used to construct sentences that represents the comprehension. The key lexical listed along with all the items under the Proper and Common lexical synset classes are used to form interpretation for the sentences. These interpretations may be like the semantic for the sentences or they may be new interpretations that are combined with prior knowledge.

The following feedback are based on the first and/or the most frequent lexical word in each lexical synset category. Table 4 (below) shows the some of the key lexical synset for the news article. The most frequent lexical words are used to create comprehension of the news article of the sentences using the key lexical (with the feedback), frequent lexical as well as the Proper and Common lexical synset classes. The comprehension uses the lexical that are pointed to by the feedback as well as the most frequently used lexical for that category. It might be the neural connections are created based on the Table 4 (below) that will be used to generate the comprehension.

Table 4a the superscripts for the lexical synset. One lexical synset category neuron is used for act, while six lexical synset categories neurons are used for artifact. The artifact lexical synset neuron has five feedback to each of the following words (semiconductors, electronic capacitors, optical devices, lenses, x-ray device) which are used to construct the comprehension for the text. The key lexical are the lexical that are pointed to by the feedback. For comprehension, this model implements the noun-verb-noun constraint as shown above where noun phrase is in pink and verb phrase are green. Comprehension of the news article involves multiple level of analysis. It includes understanding basic part of speech such as noun and verb to determine the semantic for the sentences. Knowledge of the lexical synset categories (i.e. group, act, quantity, cognition etc.) is needed for the comprehension of the news article.

Comprehension requires understanding the syntactic, semantic and the lexical synset. Therefore, comprehension of the news article requires multiple levels of analysis to interpret the text. The lexical synsets categories are in fact the properties for words in the sentences. This property gives detail information about the meaning of the word. Tables 4 (below) shows the various words that will be used to create comprehension of the summary. As shown below the partial semantic and the comprehension for the sentence are similar. The comprehension also includes the semantic for the sentence. The words are put into noun or verb phrase. Summation is important in determining semantics. In terms of comprehension counting the number of inputs to each lexical synset category is also important as well. In terms of comprehension the superscript here does not denote summation as in the case for partial semantic (Mitchell, 2015). Here the superscript denotes position within the lexical synset category. However, five artifact lexical synset categories would be needed in order to feedback to each word. Therefore artifact$^1$ should feedback to semiconductor$_{3.2}$, artifact$^2$ to electron capacitors$_{3.9}$, artifact$^3$ to optical device$_{3.14}$ etc.

artifact=semiconductors$_{3.2}$, electronic capacitors$_{3.9}$, optical devices$_{3.14}$, lenses$_{3.15}$, x-ray device$_{4.2}$ artifact=semiconductors=1, electronic capacitors=2, optical devices=3, lenses=4, x-ray device=5, Meaning gives only one interpretation of a sentence while the comprehension give multiple interpretation of that same sentence. Thus, the comprehension of the sentences overlaps with the semantic for the sentences. Comprehension is the rearrangement of the lexical synset into a different pattern to derive the same interpretation of the sentence. Both lexical synset and lexical synset categories can be used for pointing. Another finding is that the might have a text filtering structure where sentences are synthesized into a reduced format in order to focus on the most important information.

Table 4 shows the words that will be used to create the comprehension of the news article.

TABLE 4 contains the index numbers for the key lexical synset

| | | |
|---|---|---|
| act = shipments$_{1.4}$, manufacturing$_{3.4}$ (noun) | creation = manufacturing$_{1.5}$ (verb) | possession = |
| artifact = semiconductors$_{3.2}$, electronic capacitors$_{3.9}$, optical devices$_{3.14}$, lenses$_{3.15}$, x-ray | group = Commerce Department$_{1.1}$, industries$_{1.6}$, manufacturing industries$_{2.14}$, | rates$_{2.3/rate3.20}$ process = growth$_{2.2}$ quantity = |

TABLE 4-continued contains the index numbers for the key lexical synset

| | | |
|---|---|---|
| device$_{4.2}$ | manufacturers$_{4.1}$, | increase$_{1.3}$ |
| attribute = gap$_{2.1}$ | producers$_{4.10}$ | relation = |
| cognition = expected$_{2.9}$ | motion = following$_{3.1}$ | percent$_{1.8}$ |
| communication = projected$_{1.2}$ | perception = see$_{4.5}$ | state = top$_{2.15}$ |
| | | stative = was$_{2.4}$ |
| | | time = 1987$_{1.9}$ |

TABLE 4a

The Superscripts for the Lexical Synset Categories

| | | |
|---|---|---|
| act == shipments = 1, | creation == manufacturing = 1, | possession == |
| manufacturing = 2, | group == Commerce | rate = 1, |
| artifact == semiconductors = 1, | Department = 1, industries = 2, | process == |
| electronic capacitors = 2, optical | manufacturing industries = 3, | growth = 1 |
| devices = 3, lenses = 4, x-ray device = 5, | manufacturers = 4, producers = 5, | quantity == |
| attribute == gap = 1, | motion == following = 1, | increase = 1, |
| cognition == expected = 1, | perception == see = 1, | relation == |
| communication == projected = 1, | | percent = 1, |
| | | state == top = 1, |
| | | stative == was = 1, |
| | | time == 1987 = 1, |

The words from Table 4 are used to show how the words can be combined to present a synthesized version of the original sentences from the summary sentence.

TABLES OF COMPREHENSION FOR THE NEWS ARTICLE

| Words | Commerce Department$_{1.1}$ | projected$_{1.2}$ | increase$_{1.3}$ | ship- ments$_{1.4}$ | 1987$_{1.9}$ |
|---|---|---|---|---|---|
| Lexical synset | group | communication | quantity | act | time |
| Part-of-speech | noun | verb | | noun | |

Comprehension = Commerce department$_{1.1}$ + projected$_{1.2}$ + increase$_{1.3}$ + shipments$_{1.4}$ + 1987$_{1.9}$ = group$^1$ + communication$^1$ + quantity$^1$ + act$^1$ + time$^1$

| Gap$_{2.1}$ | growth$_{2.2}$ | rate$_{3.20}$ | expected$_{2.9}$ (in) | 1987$_{1.9}$ | (for) manu- facturing$_{1.5}$ | indus- tries$_{2.14}$ |
|---|---|---|---|---|---|---|
| attribute | process | posses- sion | cognition | time | creation | group |
| noun | | | verb | noun | verb | noun |

Comprehension = Gap$_{2.1}$ + growth$_{2.2}$ + rate$_{3.20}$ + expected$_{2.9}$ + 1987$_{1.9}$ + manufacturing$_{1.5}$ + industries$_{1.6}$ = attribute$^1$ + process$^1$ + possession$^1$ + cognition$^1$ + time$^1$ + creation$^1$ + group$^3$

| Manufac- turers$_{4.1}$ (of) | X-ray devices$_{4.2}$ | ex- pected$_{2.9}$ | (to) see$_{4.5}$ | growth$_{2.2}$ (in) | ship- ments$_{1.4}$ |
|---|---|---|---|---|---|
| group | artifact | cognition | perception | process | artifact |
| noun | | verb | | | noun |

Comprehension = Manufacturers$_{4.1}$ + x-ray devices$_{4.2}$ + expected$_{2.9}$ + see$_{4.5}$ + growth$_{2.2}$ + shipment$_{1.4}$ = group$^4$ + artifact$^5$ + cognition$^1$ + perception$^1$ + process$^1$ + act$^1$

| Top$_{2.15}$ | manufacturers$_{4.1}$ | projected$_{1.2}$ | growth$_{2.2}$ | (for) electronic capacitors$_{3.9}$ |
|---|---|---|---|---|
| state | group | communication | process | artifact |
| | noun | verb | | noun |

Comprehension = Top$_{2.15}$ + manufacturers$_{4.1}$ + projected$_{1.2}$ + growth$_{2.2}$ + electronic capacitors$_{3.9}$ = state$^1$ + group$^1$ + communication$^1$ + process$^1$ + artifact$^2$

| Growth$_{2.2}$ | projected$_{1.2\ (by)}$ | manufacturers$_{4.1}$ | (for) 1987$_{1.9}$ |
|---|---|---|---|
| Process Noun | communication verb | group | time noun |

Comprehension = Growth$_{2.2}$ + projected$_{1.2}$ + manufacturers$_{4.1}$ + 1987$_{1.9}$ = process$^1$ + communication$^1$ + group$^4$ + time$^1$ Table 5 shows the first or most frequent content words for the news article. These words are then use to form sentences related to the summary. Table 5a shows the superscripts for the lexical synset.

TABLE 5 contains the index numbers for the key lexical synset

| | |
|---|---|
| act = service$_{2.1}$ | group = Royal Danish Porcelain Factory$_{1.2}$, set$_{1.6}$ |
| attribute = royal$_{1.13}$ | location = Denmark$_{1.16}$, Russia$_{1.19}$, Europe$_{3.7}$, Meissen$_{3.9}$, |
| change = died$_{4.2}$ | collection$_{7.9}$, Windsor Castle$_{7.11}$, |
| cognition = it$_{5.6}$ | person = king$_{1.15}$, Catherine the Great$_{1.18}$, Danish$_{2.16}$, |
| communication = illustrated$_{2.14}$ | regent$_{5.4}$, cook$_{5.16}$, Princess Alexandra$_{6.8}$, Albert Edward$_{6.14}$ |
| catalog$_{2.15}$ | heir$_{6.15}$, English$_{6.16}$, princess$_{7.1}$, Queen Elizabeth II$_{7.10}$ |
| consumption = serving$_{1.11}$ | possession = received$_{1.3}$, commission$_{1.4}$, had4$_{.8}$, |
| creation = create$_{1.5}$ (first), | plant = flower$_{2.6}$, plants$_{2.7}$, bamboov3.14 |
| decorated$_{2.4}$ (frequent) | pronoun = who$_{6.10}$ |
| time = 1790$_{1.1}$ | food = dinner$_{3.3}$, pastry$_{5.15}$, dessert$_{5.24}$ |
| social = made$_{3.8}$ | animal = tiger$_{3.13}$ |
| stative = was$_{2.2}$ | artifact = china$_{1.7}$, place setting$_{1.9}$, pieces$_{1.12}$, gift$_{1.14}$, |
| motion = drawn$_{2.8}$ | paintings$_{2.5}$, scientific works$_{2.11}$, Flora Danica$_{2.12}$, flora$_{2.17}$, |
| quantity = 80$_{1.8}$ | porcelain$_{3.2}$, throne$_{6.17}$ |
| relation = first$_{3.1}$ | |

TABLE 5a

The superscripts for the lexical synset categories

| | |
|---|---|
| act == service = 1, | group == Royal Danish Porcelain Factory = 1, set = 2, |
| attribute == royal = 1, | |
| change == died = 1, | location == Denmark = 1, Russia = 2, Europe = 3, Meissen = 4, |
| cognition == it = 1, | collection = 5, Windsor Castle = 6, |
| communication == illustrated | person == king = 1, Catherine the Great = 2, Danish = 3, |
| catalog = 1, | regent = 4, cook = 5, Princess Alexandra = 6, Albert Edward = 7, |
| consumption == serving = 1, | heir = 8, English = 9, princess = 10, Queen Elizabeth II = 11, |
| creation == create = 1, | possession == received = 1, commission = 2, had = 3 |
| decorated = 2, | plant == flower = 1, plants = 2, bamboo = 3, |
| time == 1790 = 1, | pronoun == who = 1, |
| social == made = 1, | food == dinner = 1, pastry = 2, dessert = 3, |
| stative == was = 1, | animal == tiger = 1, |
| motion == drawn = 1, | artifact == china = 1, place setting = 2, pieces = 3, gift = 4, |
| quantity == 80 = 1, | paintings = 5, scientific works = 6, Flora Danica = 7, flora = 8, |
| relation == first = 1, | porcelain = 9, throne = 10, |

TABLES OF COMPREHENSION FOR THE NEWS ARTICLE

| 1790$_{1.1}$ | Royal Danish Porcelain Factory$_{1.2}$ | received$_{1.3}$ | commission$_{1.4}$ | create$_{1.5}$ | (to) set$_{1.6}$ | (of) china$_{1.7}$ |
|---|---|---|---|---|---|---|
| time | group | possession | possession | creation | group | artifact |
| noun | noun | verb | noun | verb | noun | noun |

| (The) first$_{3.1}$ | porcelain$_{3.2}$ | dinner$_{3.3}$ | service$_{2.1}$ | made$_{3.8}$ | (in) Meissen$_{3.9}$ | was$_{2.2}$ | decorated$_{2.4}$ (with) | tiger$_{3.13}$ (and) | bamboo$_{3.14}$ |
|---|---|---|---|---|---|---|---|---|---|
| relation | artifact | food | act | social | location | stative | creation | animal | plant |
| noun | noun | noun | Verb | | noun | verb | verb | noun | noun |

Comprehension = relation[1] + artifact[9] + food[1] + act[1] + social[1] + location[4] + stative[1] + creation[2] + animal[1] + plant[3]

| Catherine the Great$_{1.18}$ | died$_{4.2}$ | dinner$_{3.3}$ | service$_{2.1}$ | had$_{4.8}$ (been) | made$_{3.8}$ |
|---|---|---|---|---|---|
| person noun | change verb | Food | act noun | possession | social verb |

Comprehension = person$^2$ + change$^1$ + food$^1$ + act$^1$ + possession$^3$ + social$^1$

| Princess's$_{7.1}$ | service$_{2.1}$ | place setting$_{1.9}$ | was$_{2.2}$ (in) | collection$_{7.9}$ (of) | Queen Elizabeth II$_{7.10}$ | (at) Windsor Castle$_{7.11}$ |
|---|---|---|---|---|---|---|
| person noun | act | artifact noun | stative verb | group | person noun | location |

Comprehension = person$^{10}$ + act$^1$ + artifact$^2$ + stative$^1$ + group$^5$ + person$^{11}$ + location$^6$

| Royal Danish Porcelain Factory$_{1.2}$ | received$_{1.3}$ | commission$_{1.4}$ | (for) china$_{1.7}$ (for) | Catherine the Great$_{1.18}$ |
|---|---|---|---|---|
| group noun | possession verb | possession | artifact noun | person |

Comprehension = group$^1$ + possession$^1$ + possession$^2$ + artifact$^1$ + person$^2$ Step 6 Construct the Neural Network to Answer Questions Related to the News Article (FIGS. 3 to 17).

Question and answers from the summary are used for understanding. The words who, what, when, where, why (five Ws) and how play an important role in answering the questions. The question is at the bottom of the neural network. The sentence that contains the answer are on top part of the neural network. The answer to the question are depicted with a black postsynaptic connection that is used to denote attention. Sometimes the answer is contained in multiple sentences see FIGS. 5, 6, 16 and 17.

FIGS. 3 and 3-1 answers the question "What was the projected increase in shipments by manufacturing industries for 1987?" Note in FIG. 3-1 the word What in the question points to the lexical synset category quantity$^2$ (element 17). The pronoun$^1$ neuron is pointing to the quantity$^2$ neuron. Where quantity$^2$ neuron has two input and an output that feedbacks to the noun 2. The lexical synset quantity$_3$ points the lexical synset quantity$_1$ and it has a feedback to the word increase in the sentence on top because both words are the same. Since the lexical synset category group has two input it require two lexical synset categories (group$^1$ and group$^2$) to feedback to the individual words (element 13, in FIG. 3 and element 15 in FIG. 3-1). The lexical synset category groups points (FIG. 3, element 16) to group$_2$ because the two words match (industries). Note postsynaptic connection (element 14) is pink since nothing is pointing to the lexical synset category group$^1$ which corresponds to the words Commerce Department. FIG. 3 (element 12) is a black postsynaptic connection which denotes attention.

Answer: (The) projected increase (in) shipments (by) manufacturing industries (will be) 2 percent (in) 1987.

Figure 3A:
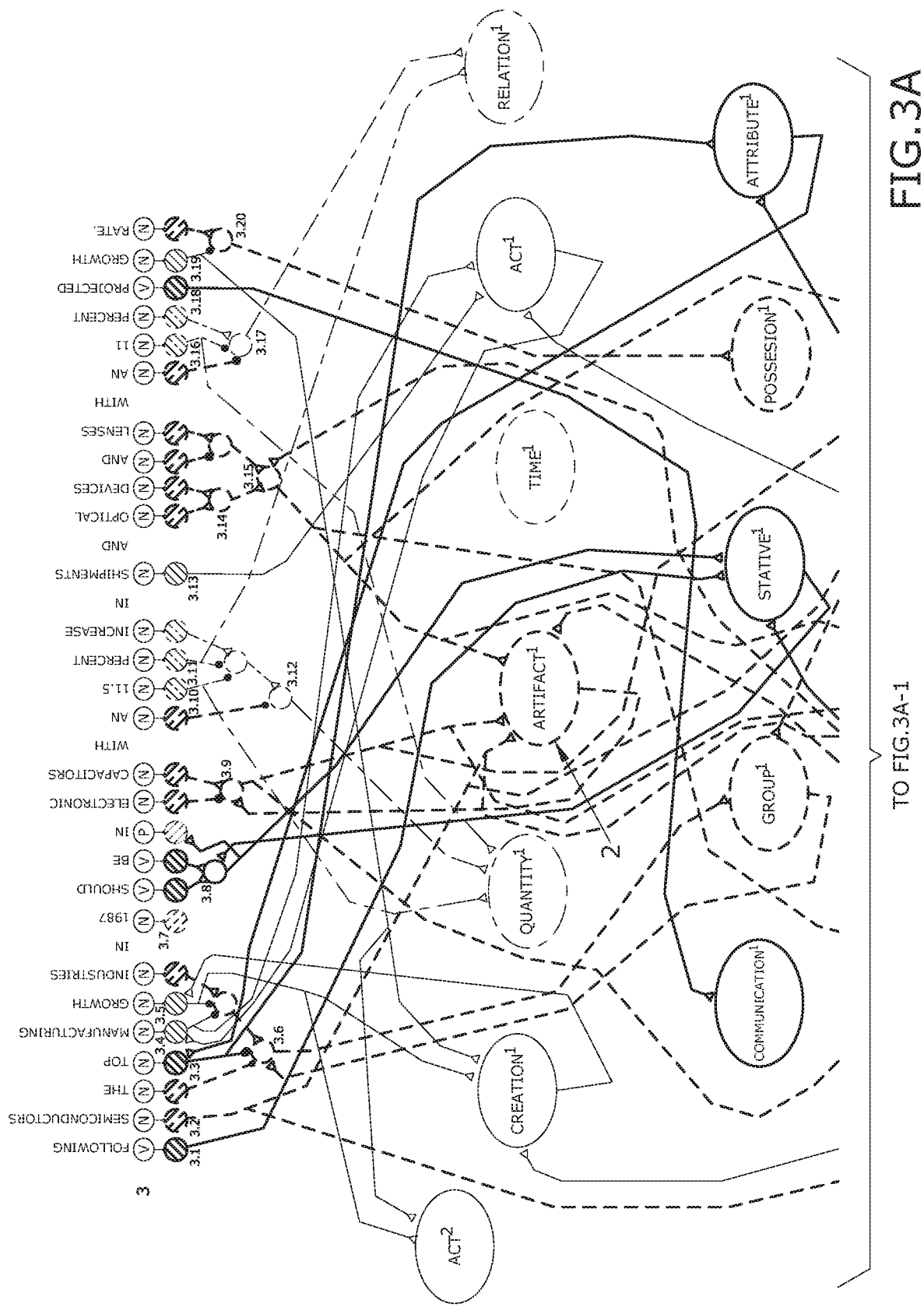
FIG. 3A illustrates a neural network that answers the question "What are the top manufacturing growth industries (in) 1987?"

FIGS. 3A and 3A-1 answers the question "What are top manufacturing growth industries (in) 1987?" Note in FIG. 3A-1 the word What (pronoun$^1$) in the question points to the lexical synset categories artifact$^1$ (element 1) and artifact$^2$ (element 2) The lexical synset categories feedback to the noun phrase electronic capacitors and optical devices and lenses respectively.

Answer: Top manufacturing growth industries (in) 1987 should be electronic capacitors (and) optical devices and lenses.

FIG. 4, 4-1 answers the question "List one reason for the third world debt crisis" The subordinate clause (FIG. 4-1 element 22) answers the question and it begins with the word that which is a preposition (element 21). The word List (verb) in the question points (element 20) to the subordinate clause which contains the answer to the question. Element 19, in FIG. 4, points to the lexical synset category communication$^1$ however, it does not have a feedback since the words List and said are not the same and List already points to another lexical synset category. If there was a feedback then the color for the postsynaptic connection would be gold. Recalled that neurons that are given attention will be depicted with a black postsynaptic connection.

Answer: one reason (the) third world debt crisis (is) that developing nations had lost $35 billion a year (in) farm exports.

Figure 5:
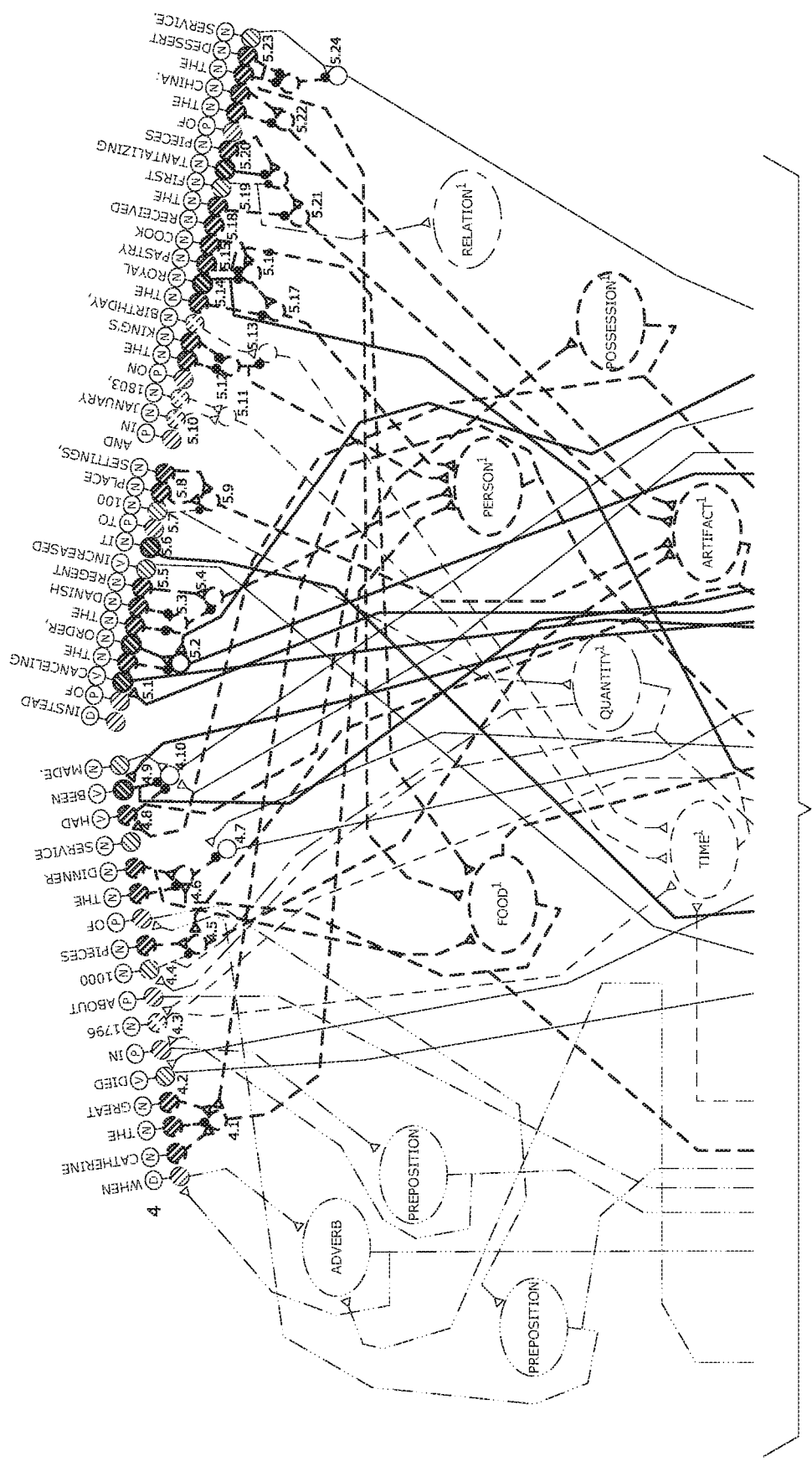
FIG. 5 illustrates a neural network that answers the question "In 1796, why did they consider cancelling the order for the dinner service?"
Figures 1, 5:
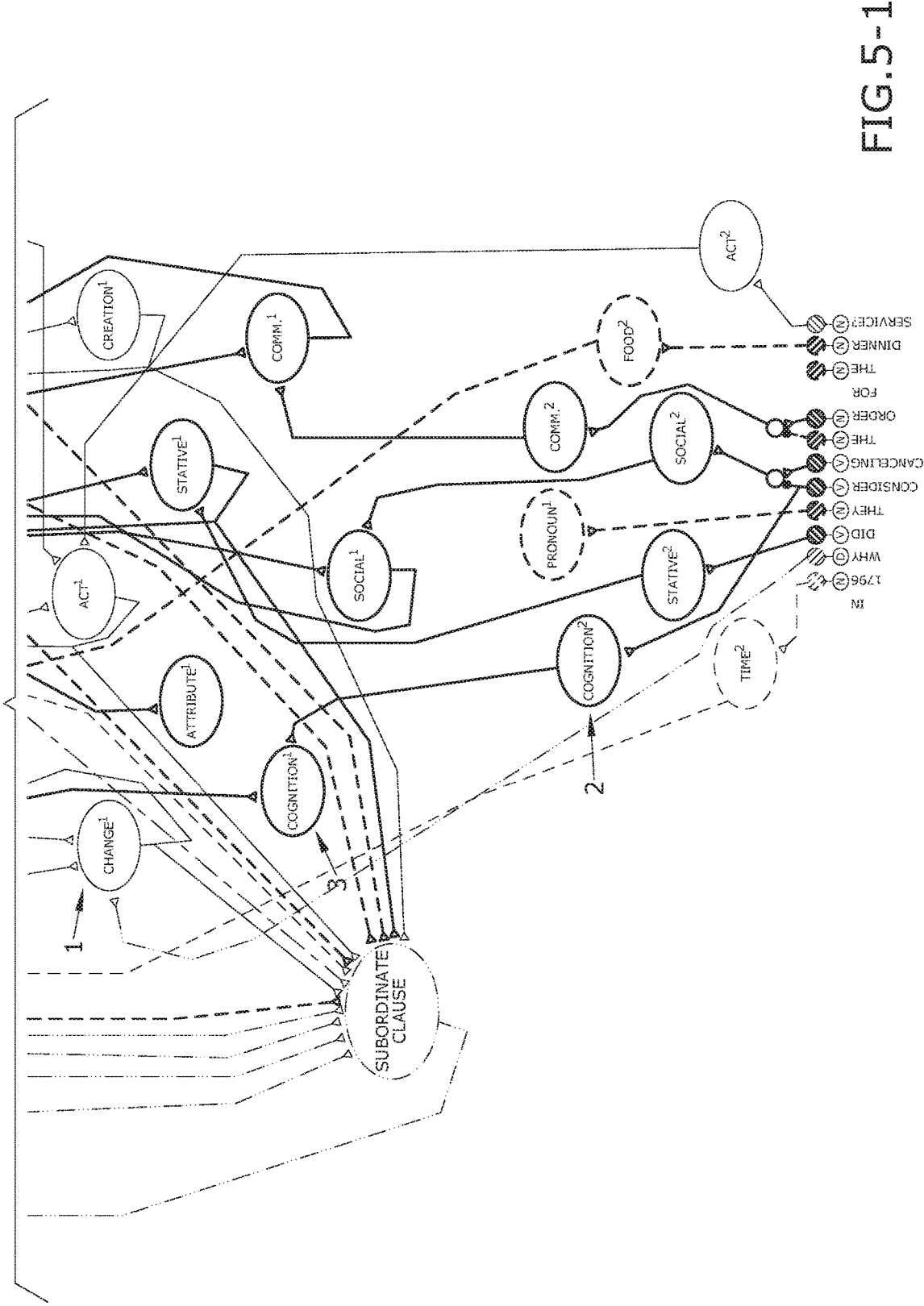

FIGS. 5 and 5-1 answers the question "In 1796 why did they consider canceling the order for the dinner service?" The first sentence contains a subordinate clause and it points to the word When at the beginning of the sentence. The word why in the question points to the lexical synset category change$^1$ (FIG. 5-1 element 1) which feedback to the word died in the first sentence. Note, lexical synset category cognition$^2$ (element 2) points to cognition$_1$ (element 3) however cognition$_1$ does not feedback to the word because the words it (noun) and consider (verb) are not the same and. If there was a feedback to the word it would have a gold postsynaptic connection.

Answer: canceling (the) order the dinner service (when) Catherine the Great died, in 1796.

Figure 6:
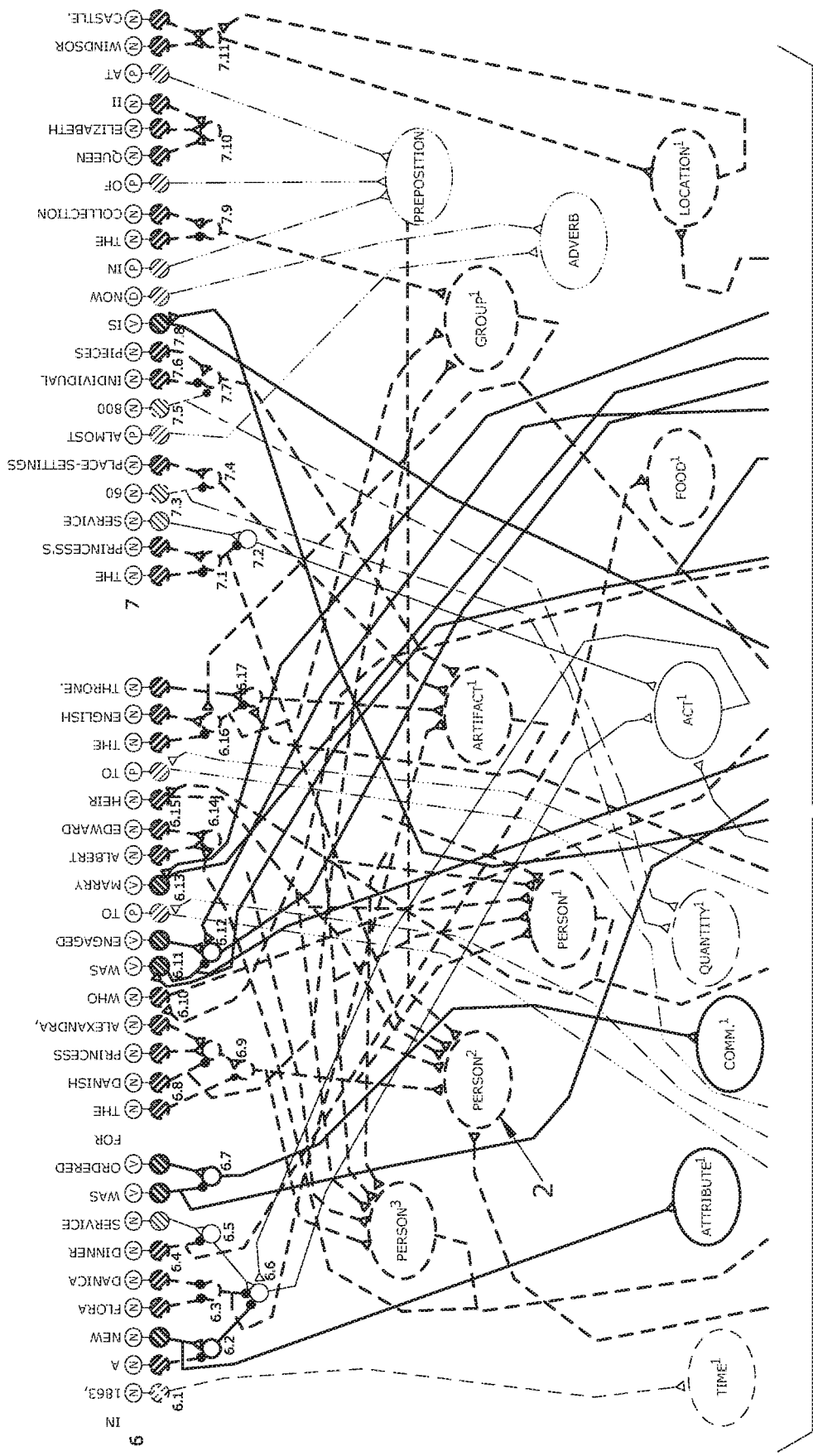
FIG. 6 illustrates a neural network that answers the question "Whose princess service is now at Windsor Castle?"
Figures 1, 6:
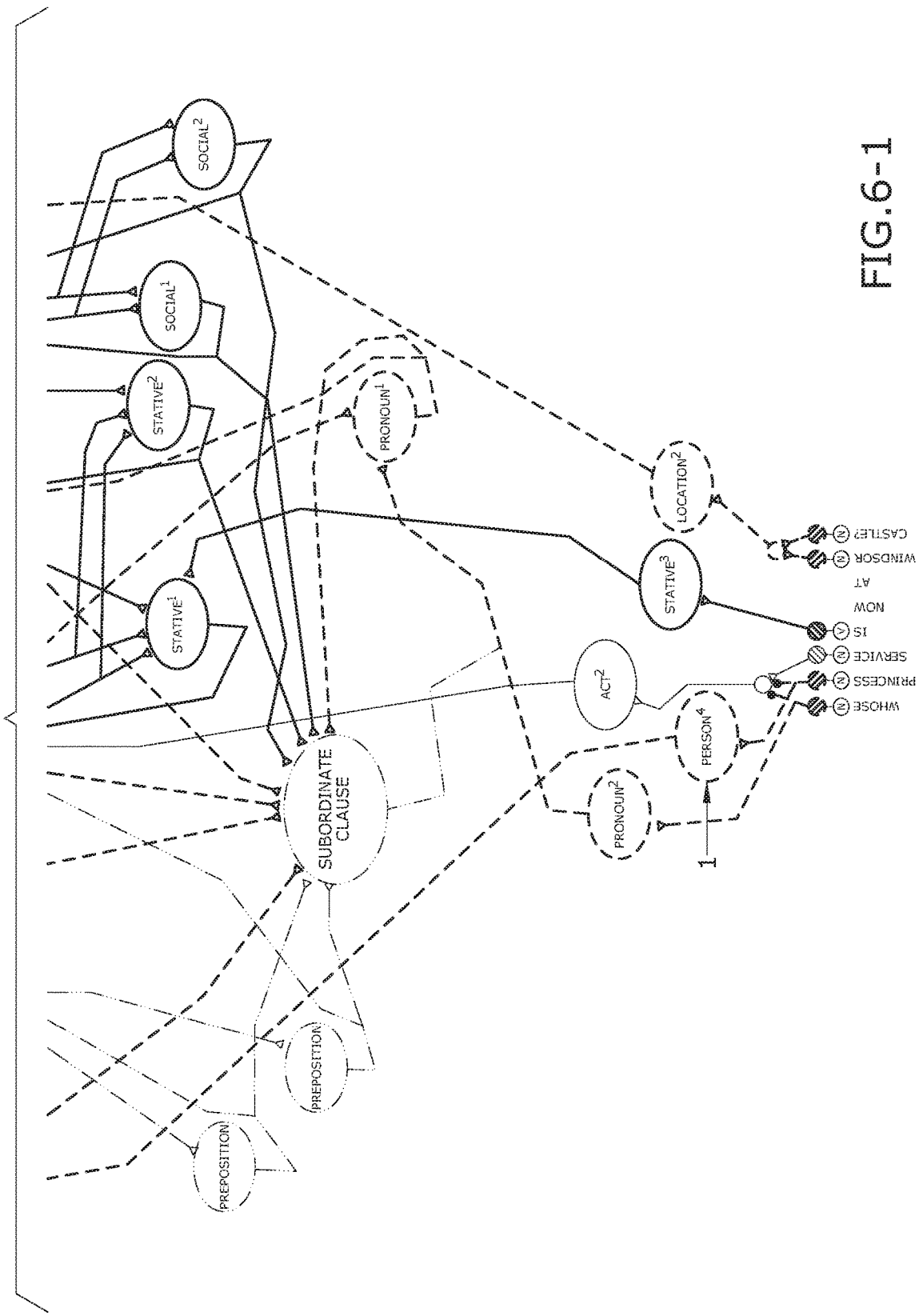

FIGS. 6 and 6-1 answers the question "Whose princess service is now at Windsor Castle?" The word princess in the question is an input to the lexical synset category person$^4$ (element 1) and it points to the lexical synset category person$^2$ (element 2) in the sentence which feedback to the words The Danish princess Alexandra.

Answer: The Danish Princess Alexandra service (at) Windsor Castle.

Figure 7:
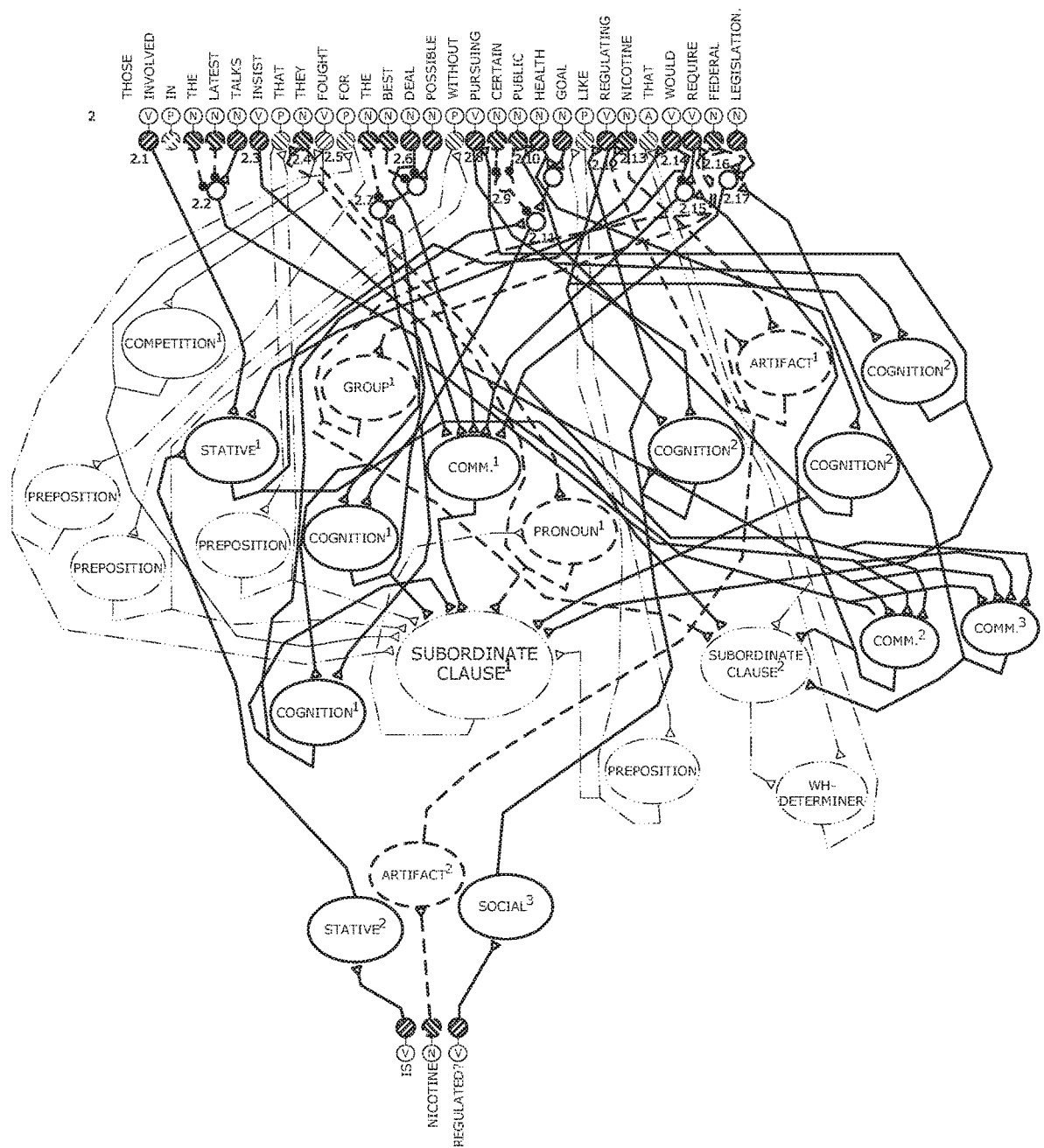
FIG. 7 illustrates a neural network that answers the question "Is nicotine regulated?"

FIG. 7 answers the question "Is nicotine regulated?" The sentence that contains the answer has two subordinate clause. The second subordinate clause2 (element 1) point to the word that which is a Wh-determiner (element 2).

Answer: Regulating nicotine that would require Federal legislation.

Figure 8:
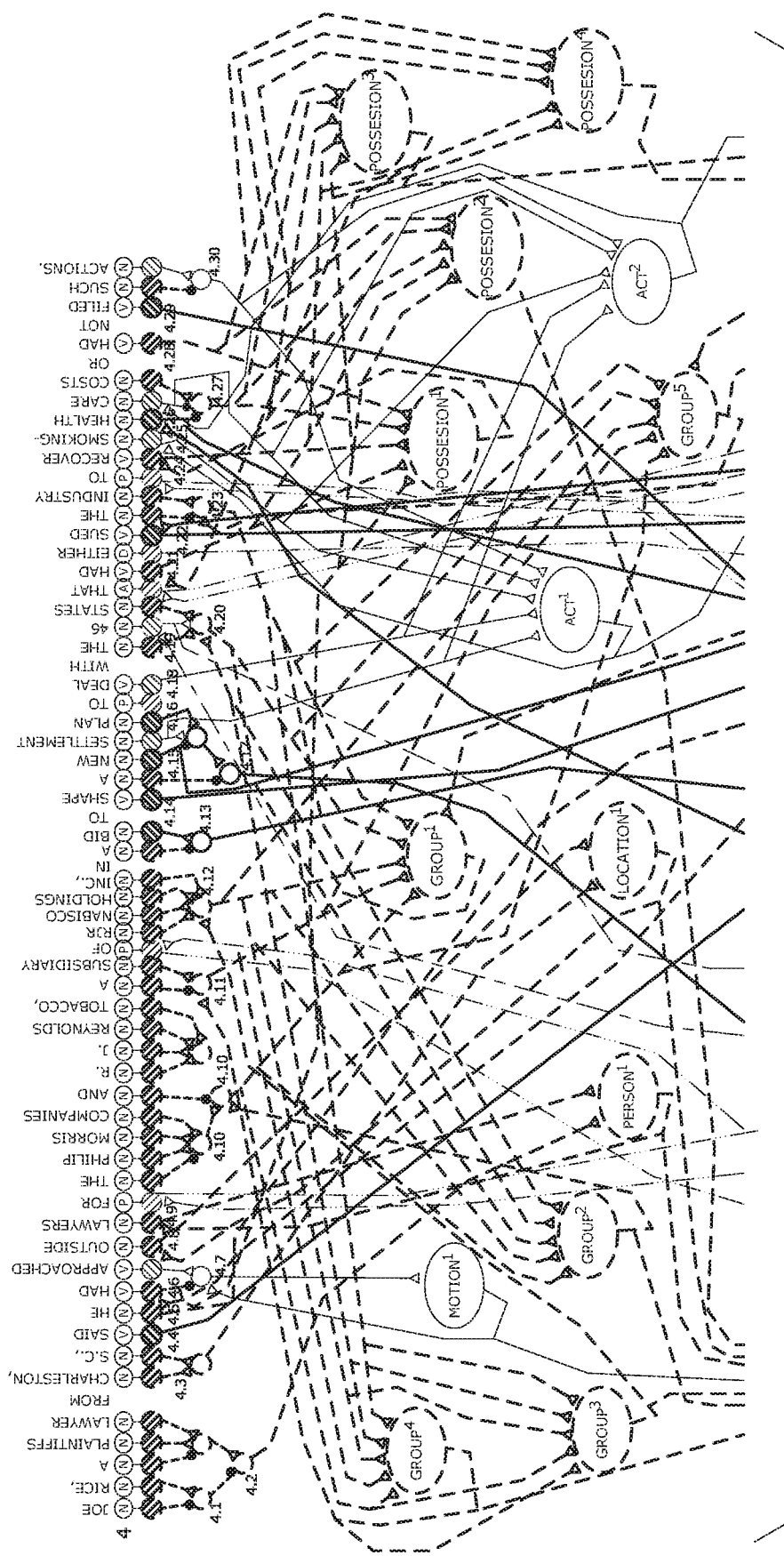
FIG. 8 illustrates a neural network that answers the question "Why 46 states sued the tobacco industry?"
Figures 1, 8:
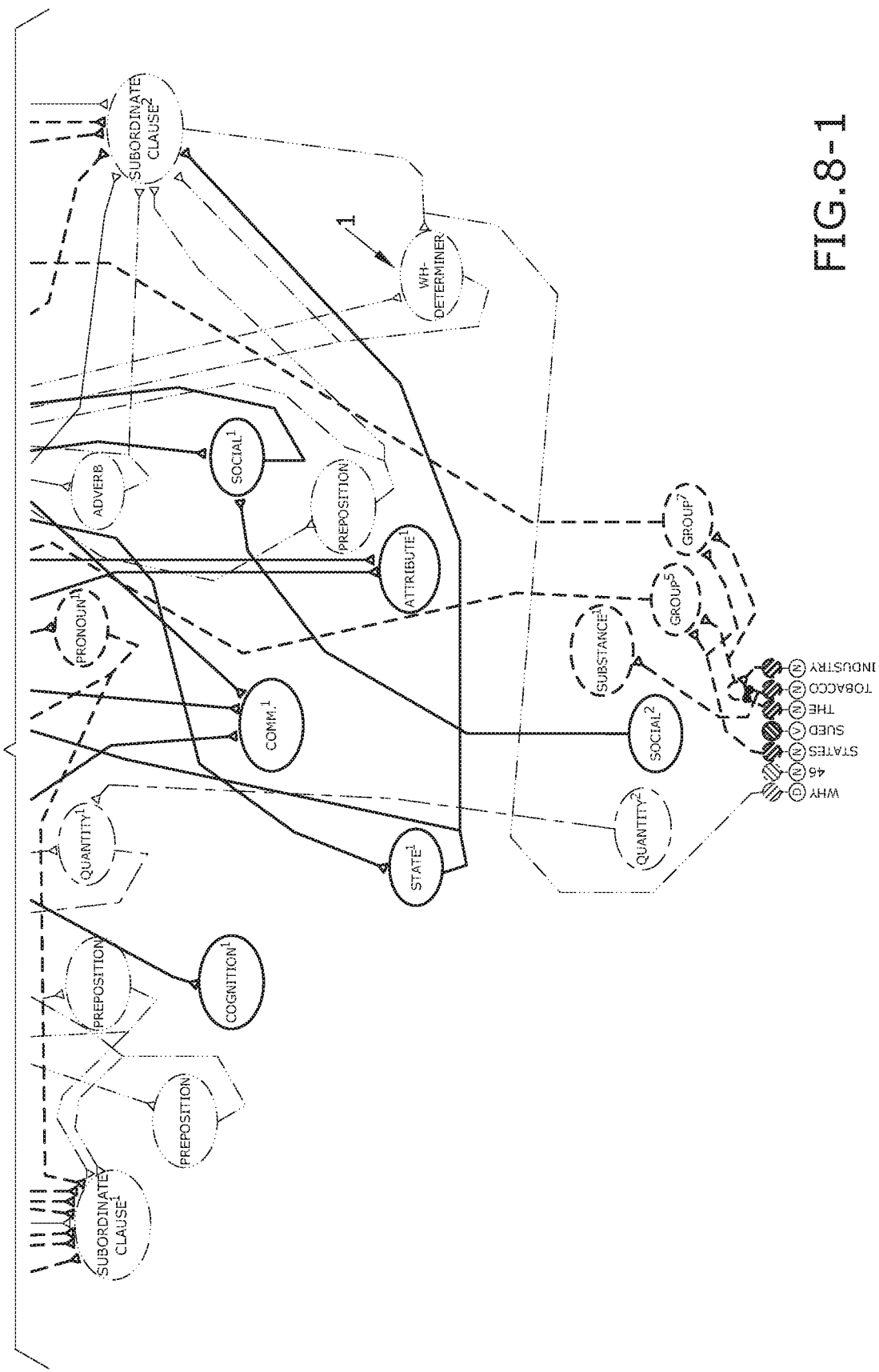

FIGS. 8 and 8-1 answer the question "Why 46 states sued the tobacco industry" The sentence that contains the answer has two subordinate clause. The second subordinate clause begin with a Wh-determiner (FIG. 8-1 element 1) which feedback to the word that which is the beginning of the answer.

Answer: the 46 states that had sued the industry to recover smoking-health care cost.

Figure 9:
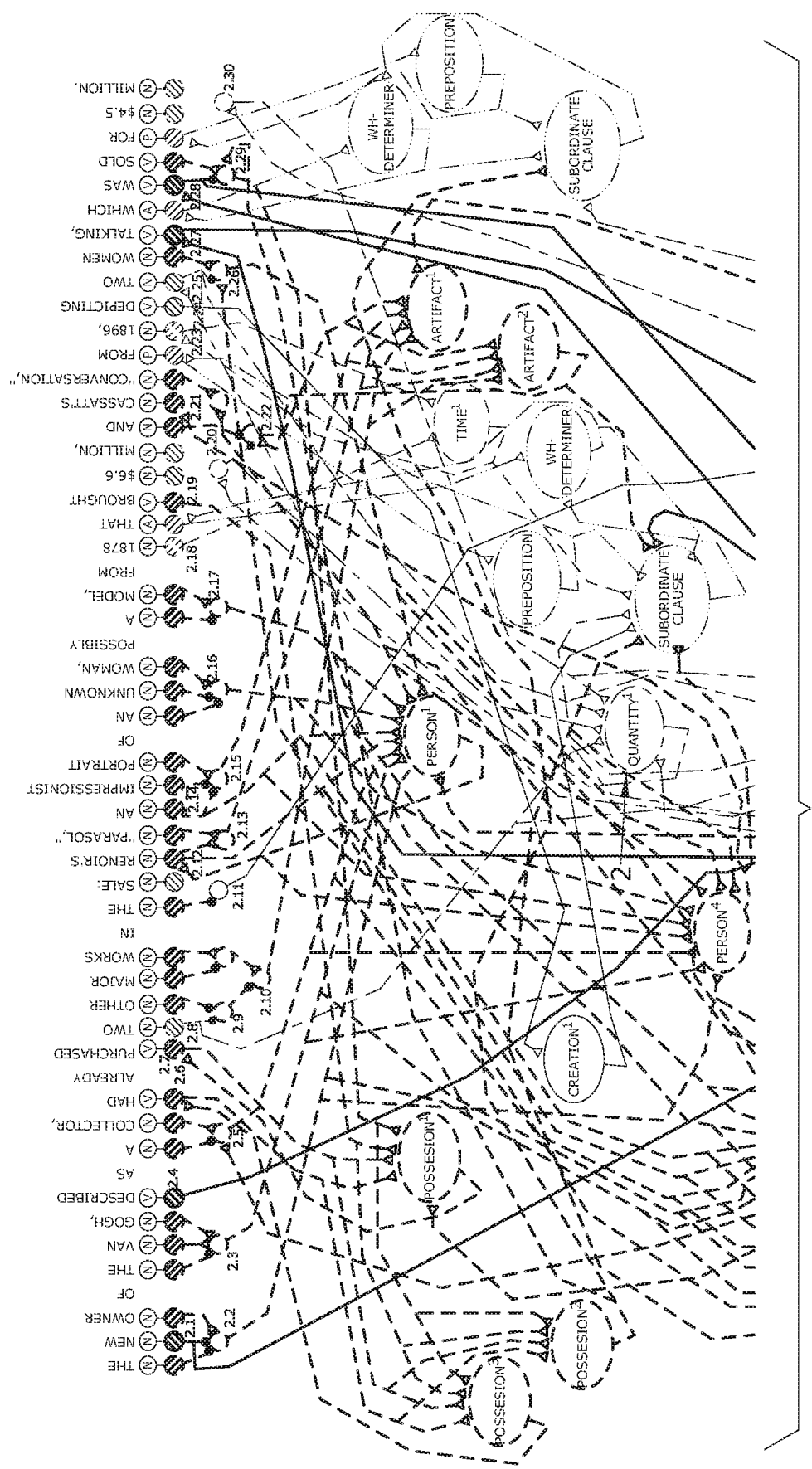
FIG. 9 illustrates a neural network that answers the question "How much was Renoir's Parasol purchased for?"
Figures 1, 9:
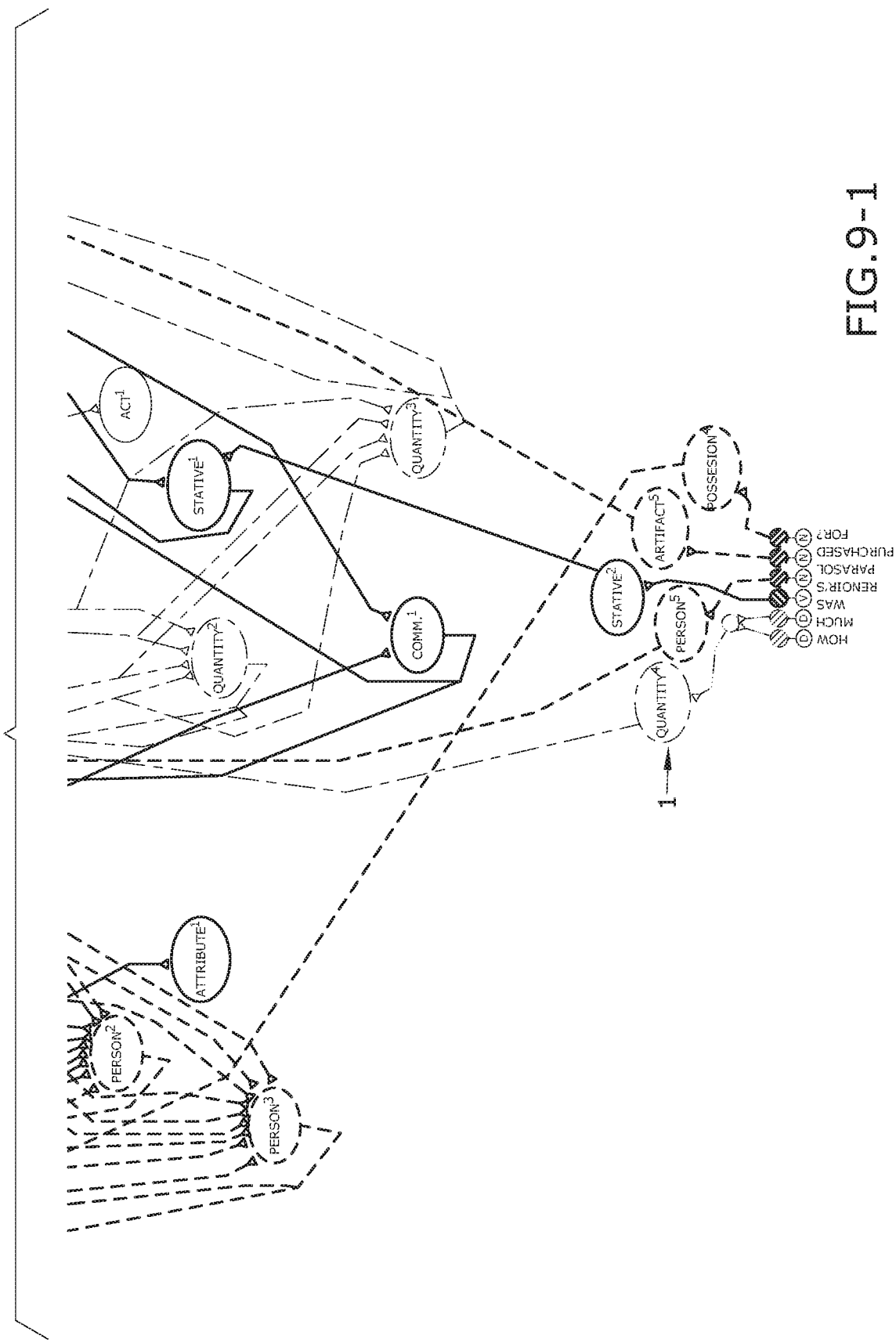

FIG. 9 answers the question "How much was Renoir's Parasol purchased for?" The words How much (preposition preposition) are input to the lexical synset category quantity$^4$ (element 1) and the quantity$^4$ points to the lexical synset category quantity$^1$ (element 2) which feedback to the words $6.6 million.

Answer: the collector had purchased Renoir's Parasol portrait (for) $6.6 million.

Figure 10:
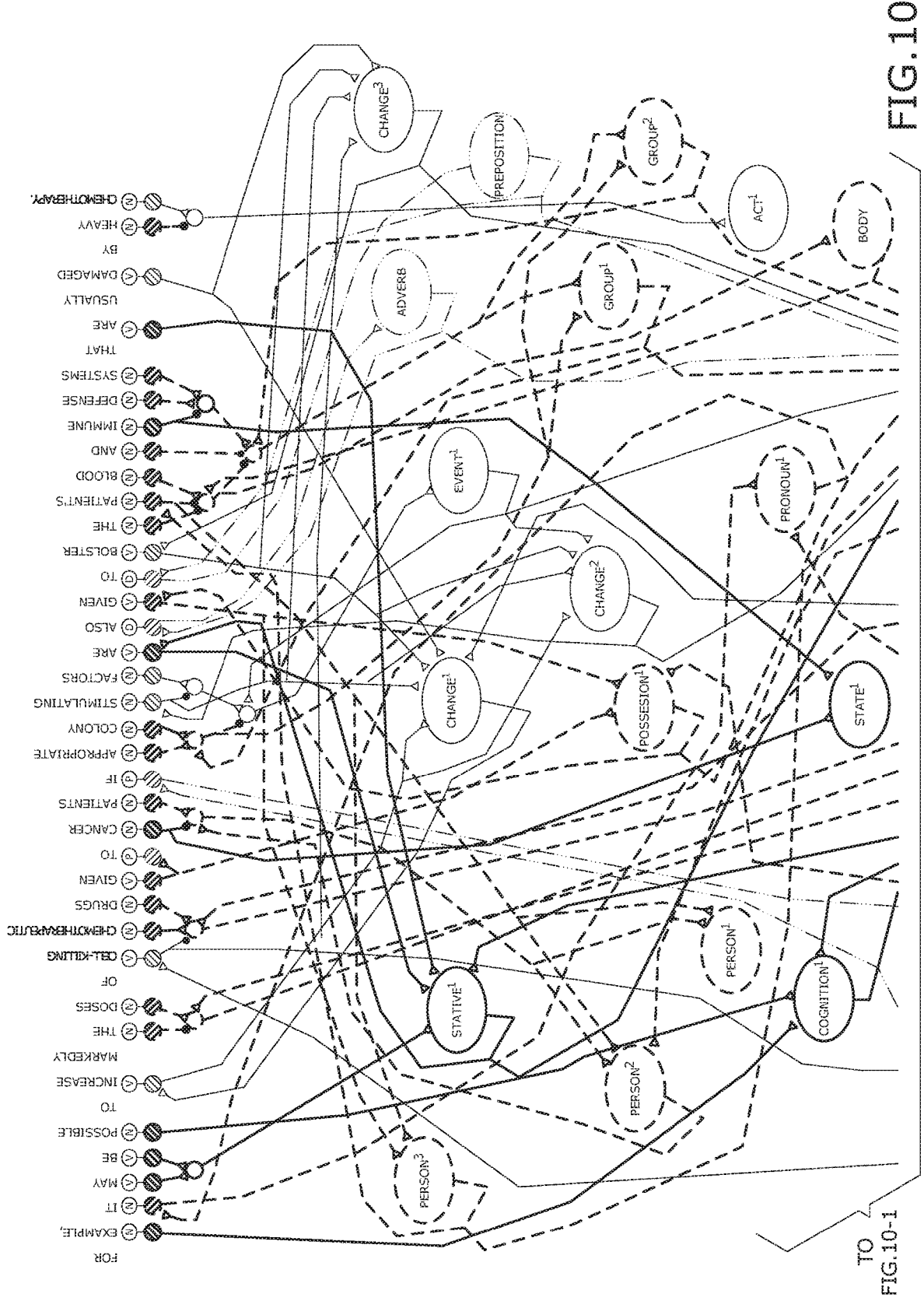
FIG. 10 illustrates a neural network that answers the question "Give one reason why it would be possible to increase the doses of cell-killing chemotherapeutic drugs in patients."
Figures 1, 10:
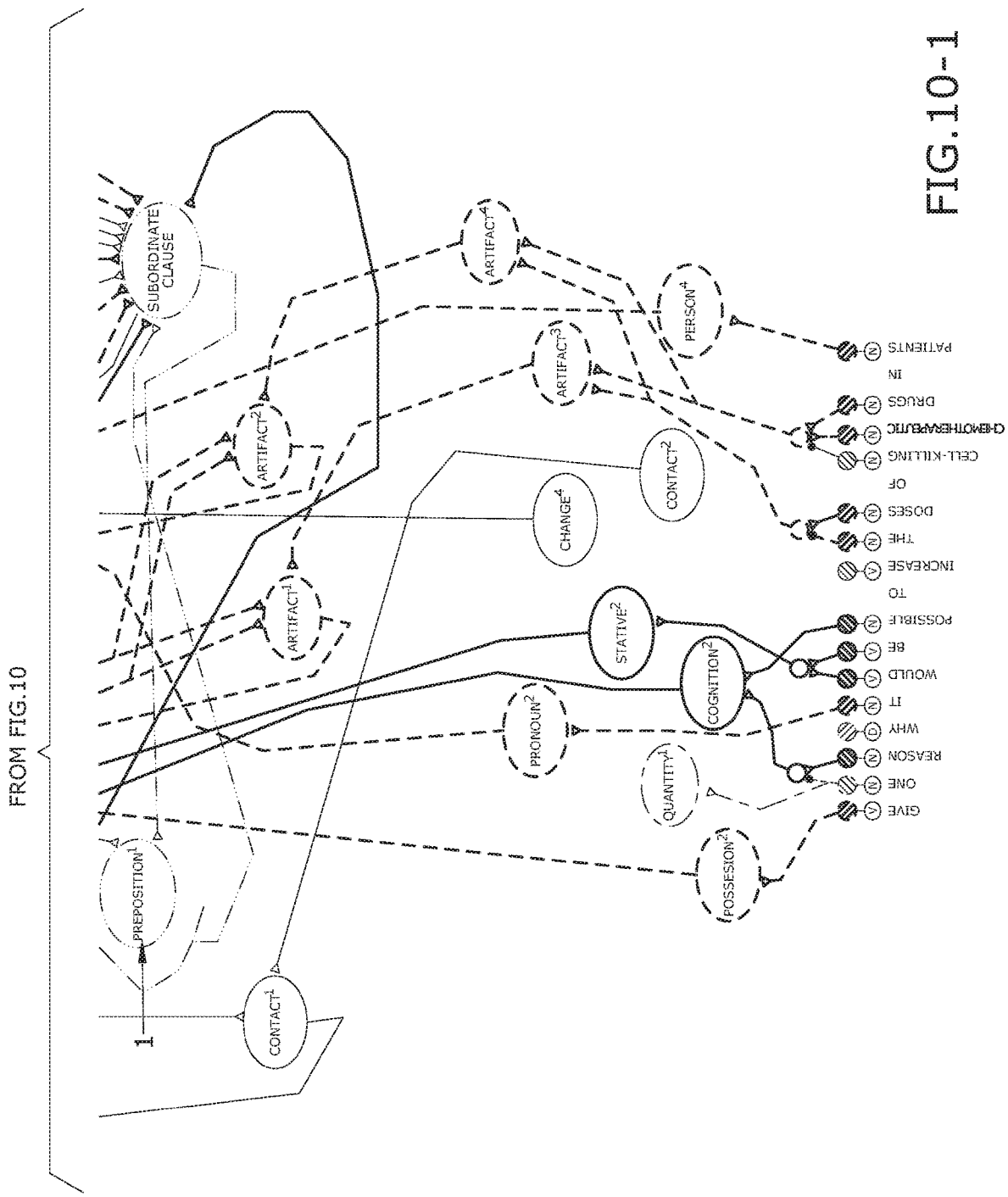
Figure 10A:
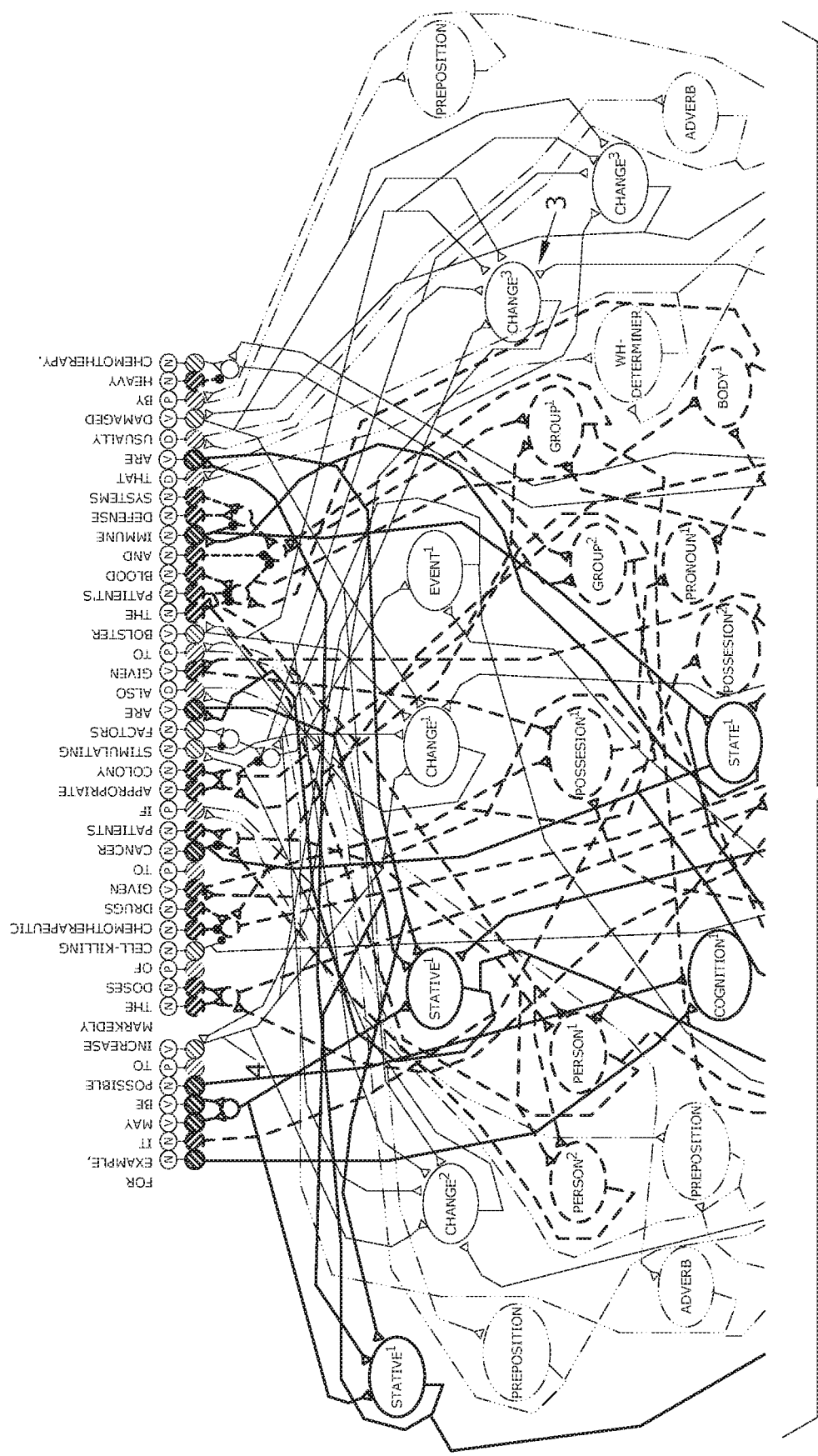
FIG. 10A illustrates a neural network that answers the question "If appropriate colony stimulating factors are given to bolster the patient's blood and immune defense systems then what happens with the doses of the chemotherapeutic drugs?"

FIGS. 10, 10-1 and 10A, 10A-1 use the same sentence (top) to answer two different questions.

FIG. 10, 10-1 answer the question "Give one reason why it would be possible to increase the doses of cell-killing chemotherapeutic drugs in patients" The answer is contained in the subordinate clause which begins with the word if (preposition)(element 1).

Answer: increase the doses of cell-killing chemotherapeutic drugs give to cancer patients if appropriate colony stimulating factors are given to bolster the patient's blood and immune defense systems.

FIG. 10A 10A-1 answer the question "If appropriate colony stimulating factors are given to bolster the patient's blood and immune defense systems then what happens with the doses of chemotherapeutic drugs." The answer is not part of the subordinate clause and it is found at the beginning of the sentence. The word happens (FIG. 10A-1 element 1) in the question which an input to the lexical synset changes (element 2) which now points to the lexical synset category change$_3$ (element 3) that feedback to the word increase.

Figure 11:
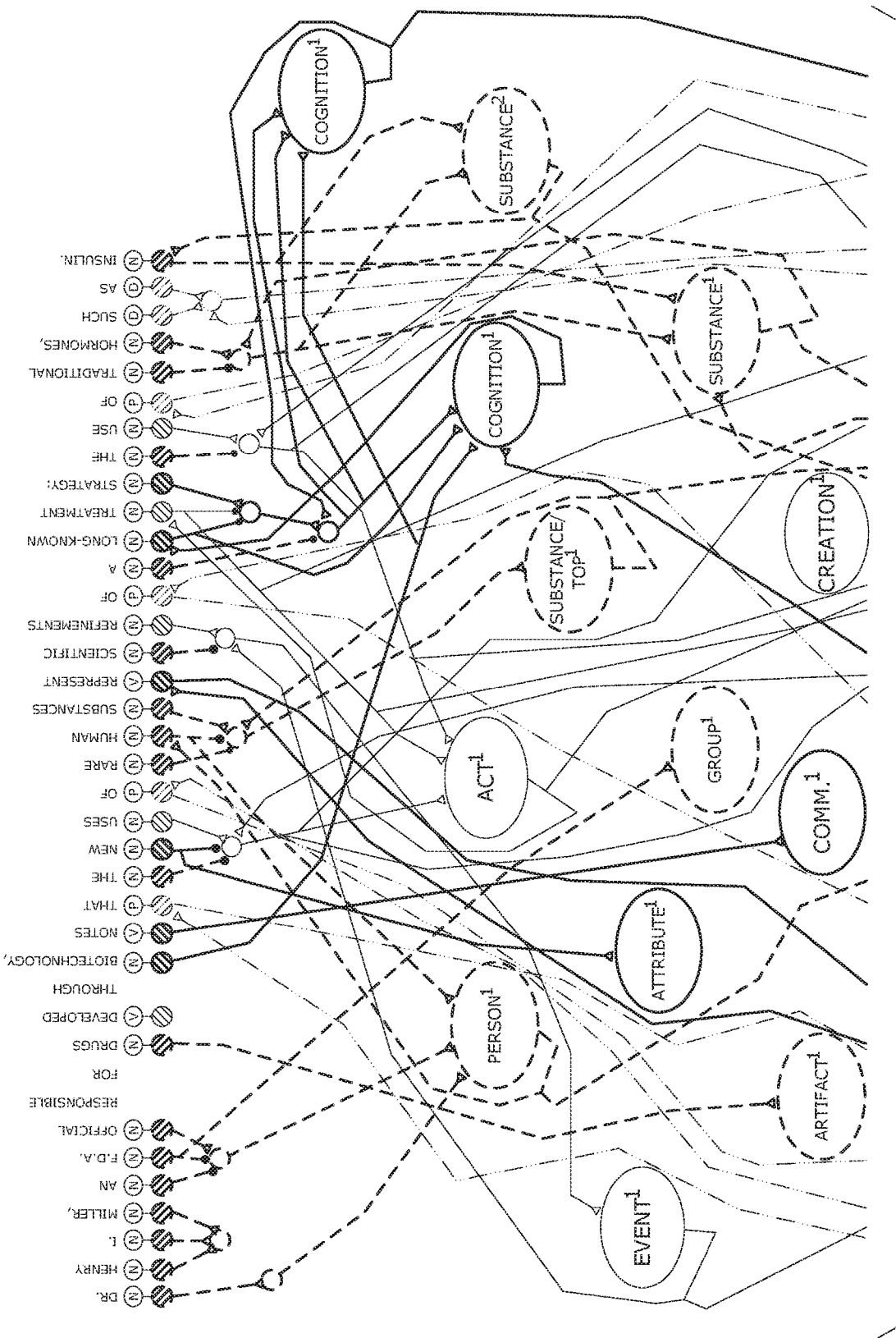
FIG. 11 illustrates a neural network that answers the question "Give an example of how hormones are used as treatment."
Figures 1, 11:
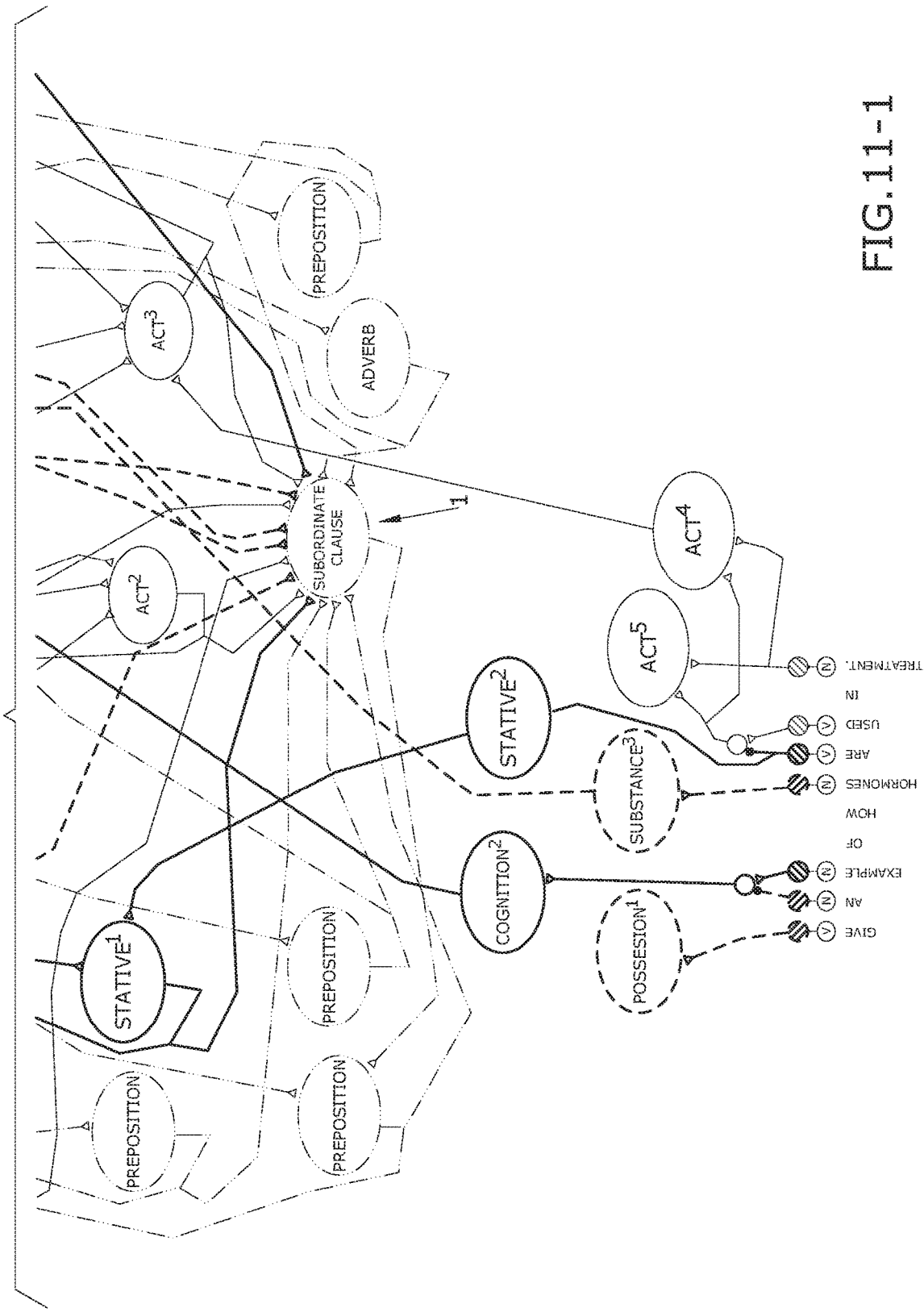

Answer: increase the doses of chemotherapeutic drugs given to cancer patients if appropriate colony stimulating factors are given to bolster the patient's blood and immune defense systems FIG. 11, 11-1 answers the question "Give an example of how hormones are used as treatment" The answer is contained in the subordinate clause (element 1). Only the words that have a black postsynaptic connection within the subordinate clause is given attention.

Answer: treatment: the use of traditional hormones such as insulin.

Figure 12:
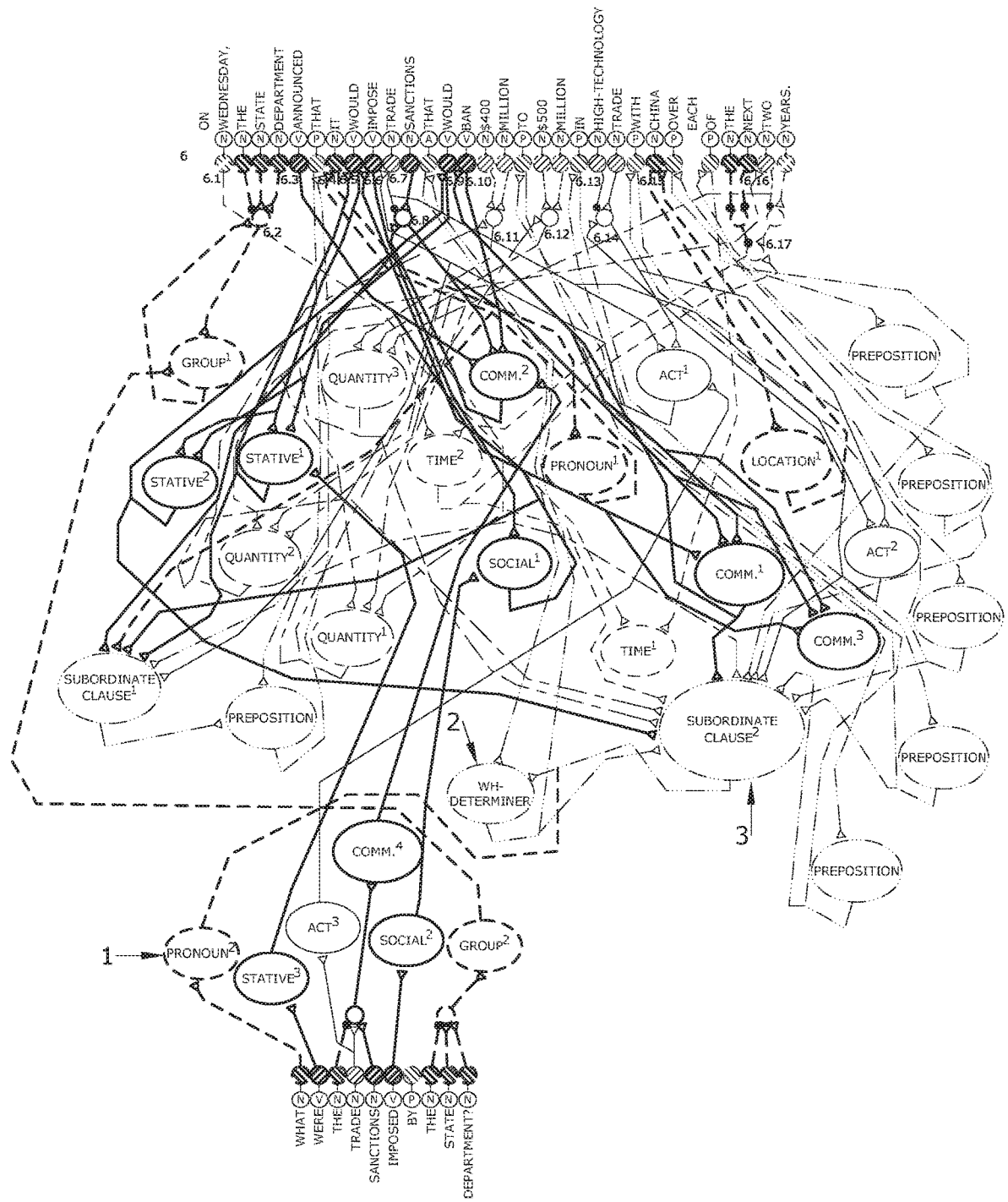
FIG. 12 illustrates a neural network that answers the question "What were the trade sanctions imposed by the State Department?"

FIG. 12 answer the question "What were the trade sanctions imposed by the State Department" The word What (pronoun2) (element 1) in the question points to the Wh-determiner (element 2) which points to the beginning of the subordinate clause2 (element 3) that contains the answer.

Answer: the State Department impose trade sanctions that would ban $400 million to $500 million in trade with China over (each) of the next two years.

Figure 13:
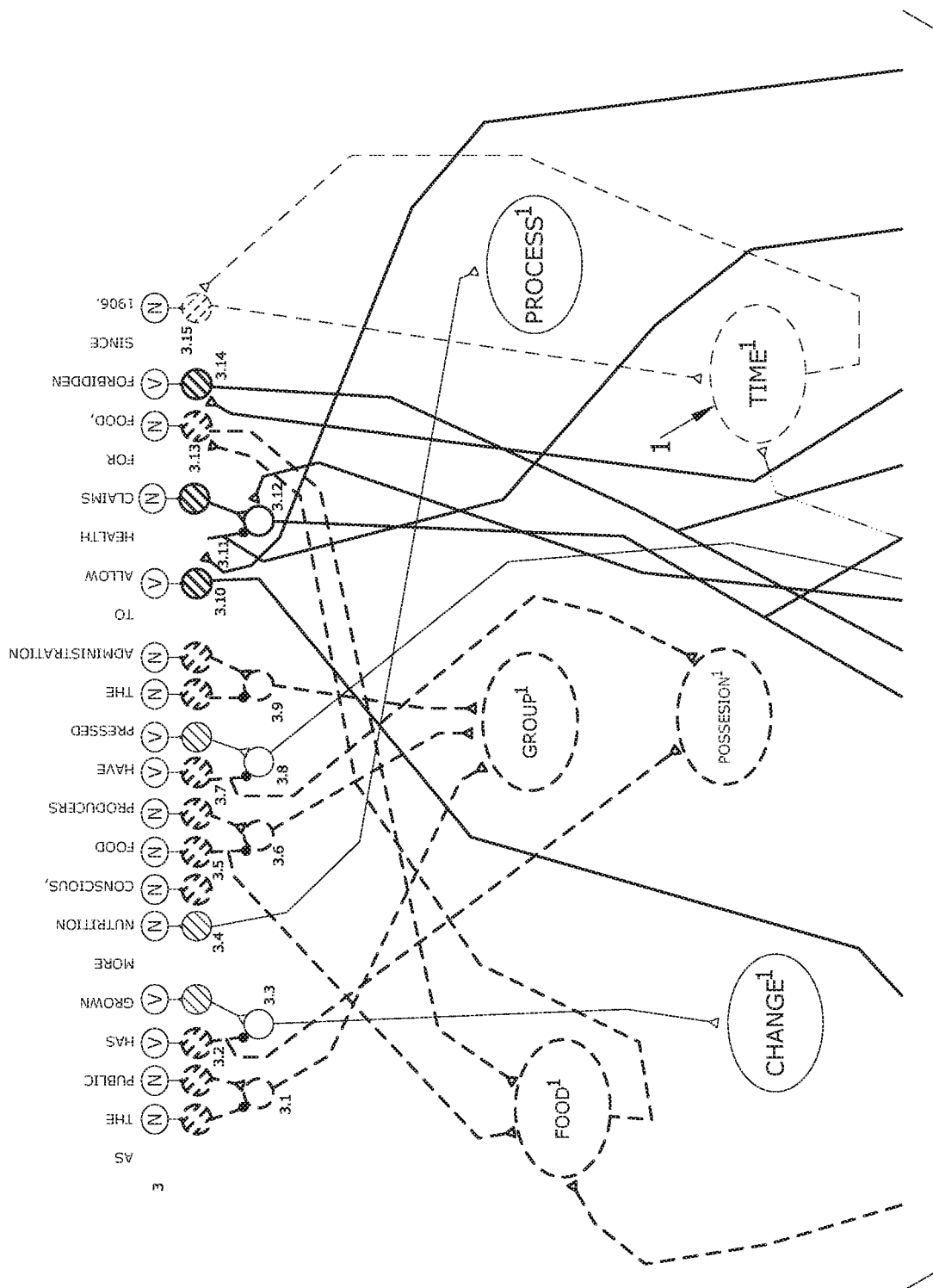
FIG. 13 illustrates a neural network that answers the question "When health claims was forbidden for foods?"
Figures 1, 13:
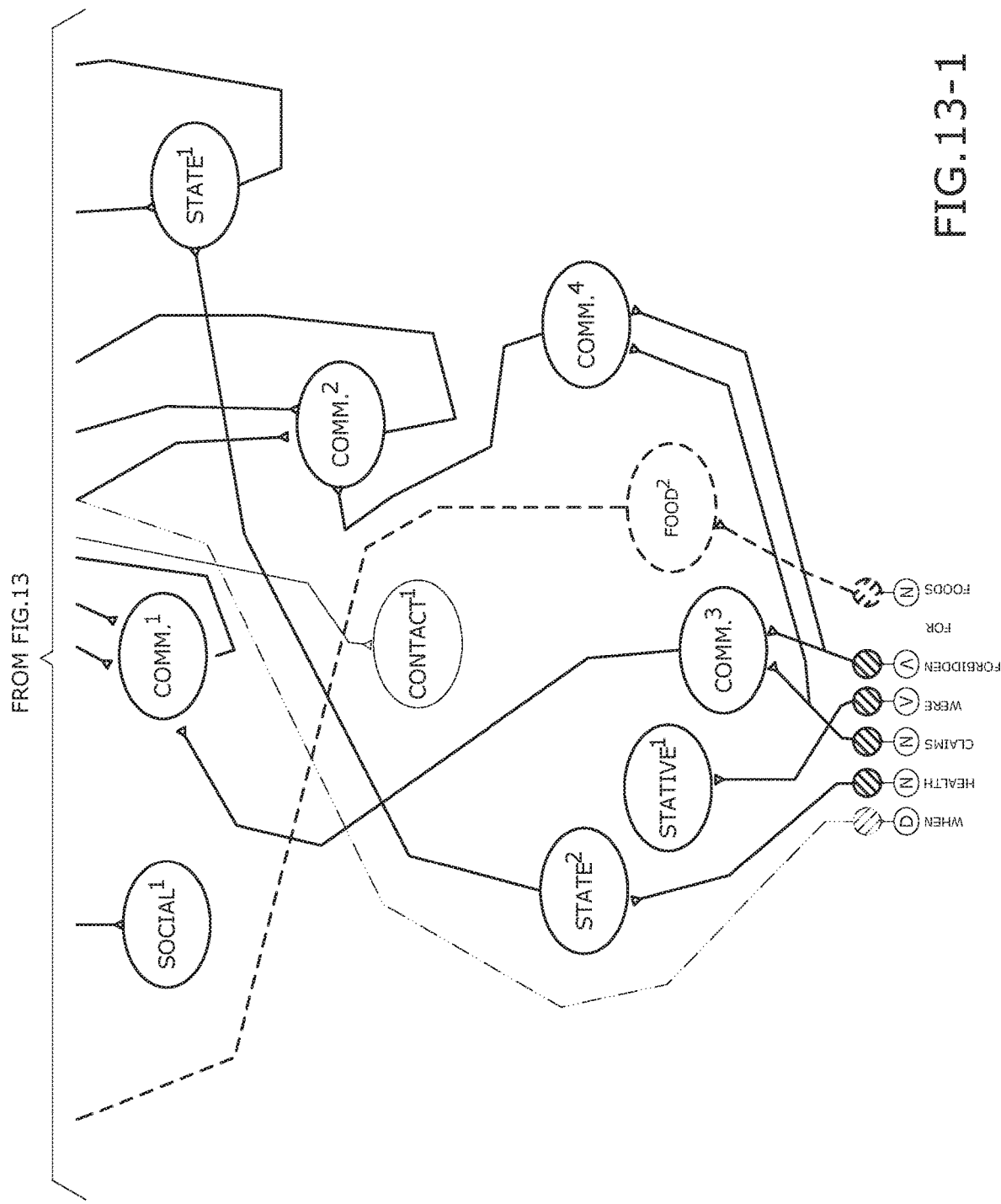

FIG. 13, 13-1 answers the question "When health claims was forbidden for foods." The word When in the question points to the lexical synset category Time$^1$ (element 1) in the sentence on the top in order to answer the question.

Answer: health claims (for) food forbidden (since) 1906.

Figure 14:
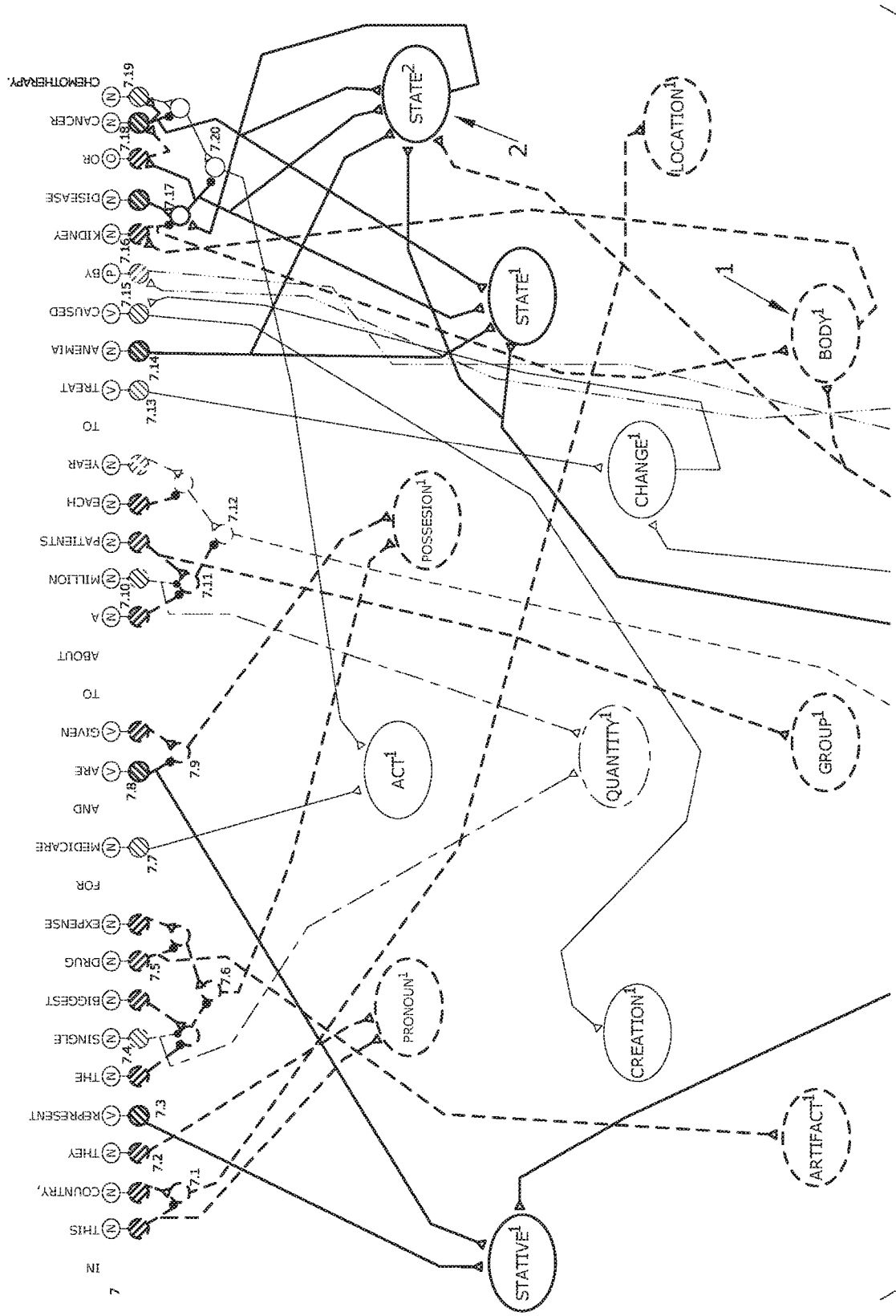
FIG. 14 illustrates a neural network that answers the question "What is anemia caused by?"

FIG. 14, 14-1 answers the question "What is anemia caused by?"

Note, the lexical synset category pronoun$^2$ points to both kidney (body$^1$-element 1) and disease (state$^2$-element 2). Lateral excitation is used to complete the answer. Recall that the five Ws are important for understanding and therefore they play an important role in answering the questions.

Answer: anemia caused by kidney disease or cancer chemotherapy.

Figures 1, 15:
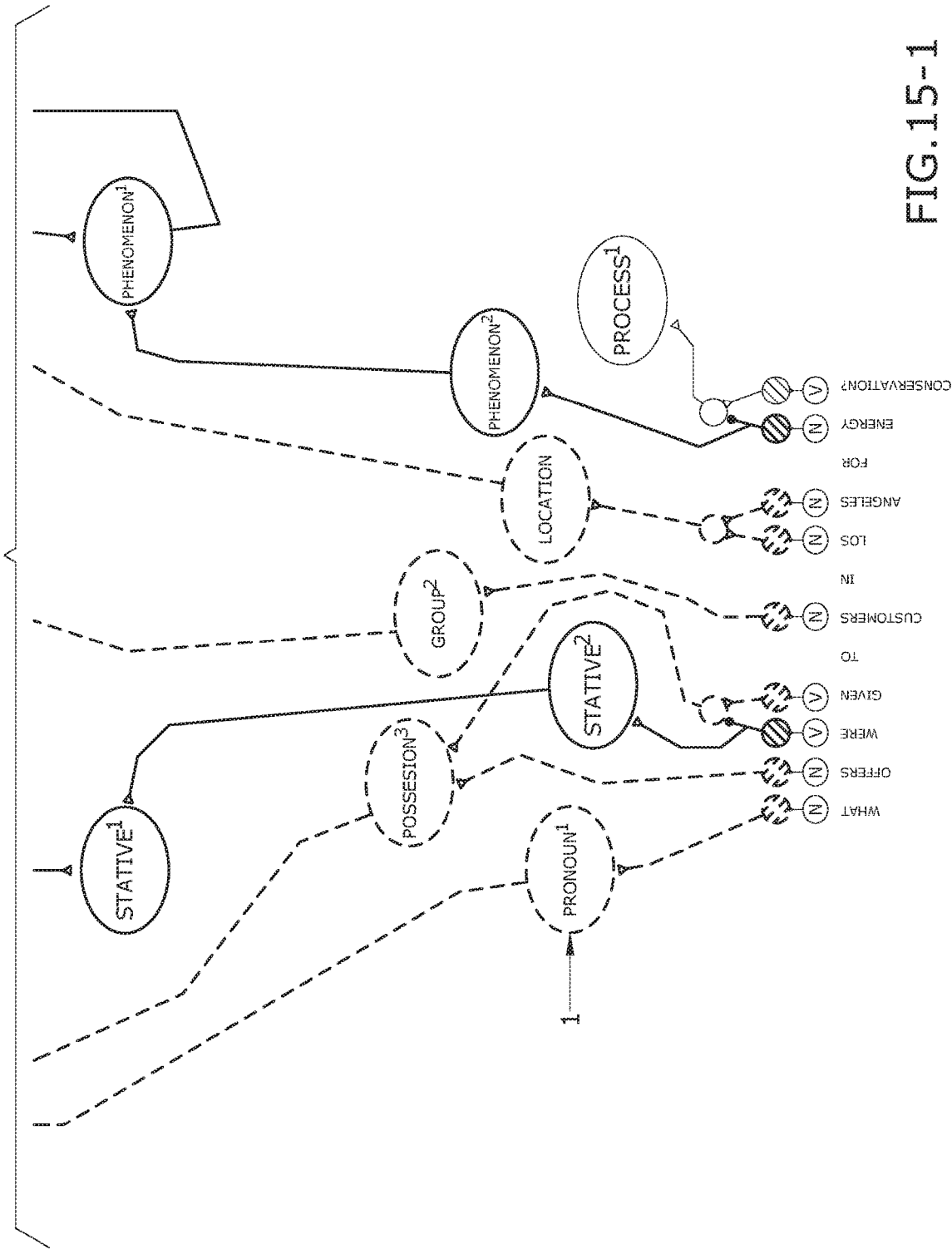
FIG. 15 illustrates a neural network that answers the question "What offers were given to customer in Los Angeles for energy conservation?"

FIG. 15, 15-1 answers the question "What offers were given to customer in Los Angeles for energy conservation?" The word What (pronoun$^1$) (element1) in the question points to the possession$_2$ (element 2) which is the noun phrase cash rebate.

Answer: Los Angeles has been offering customers cash rebates (for) solar energy

Figure 16:
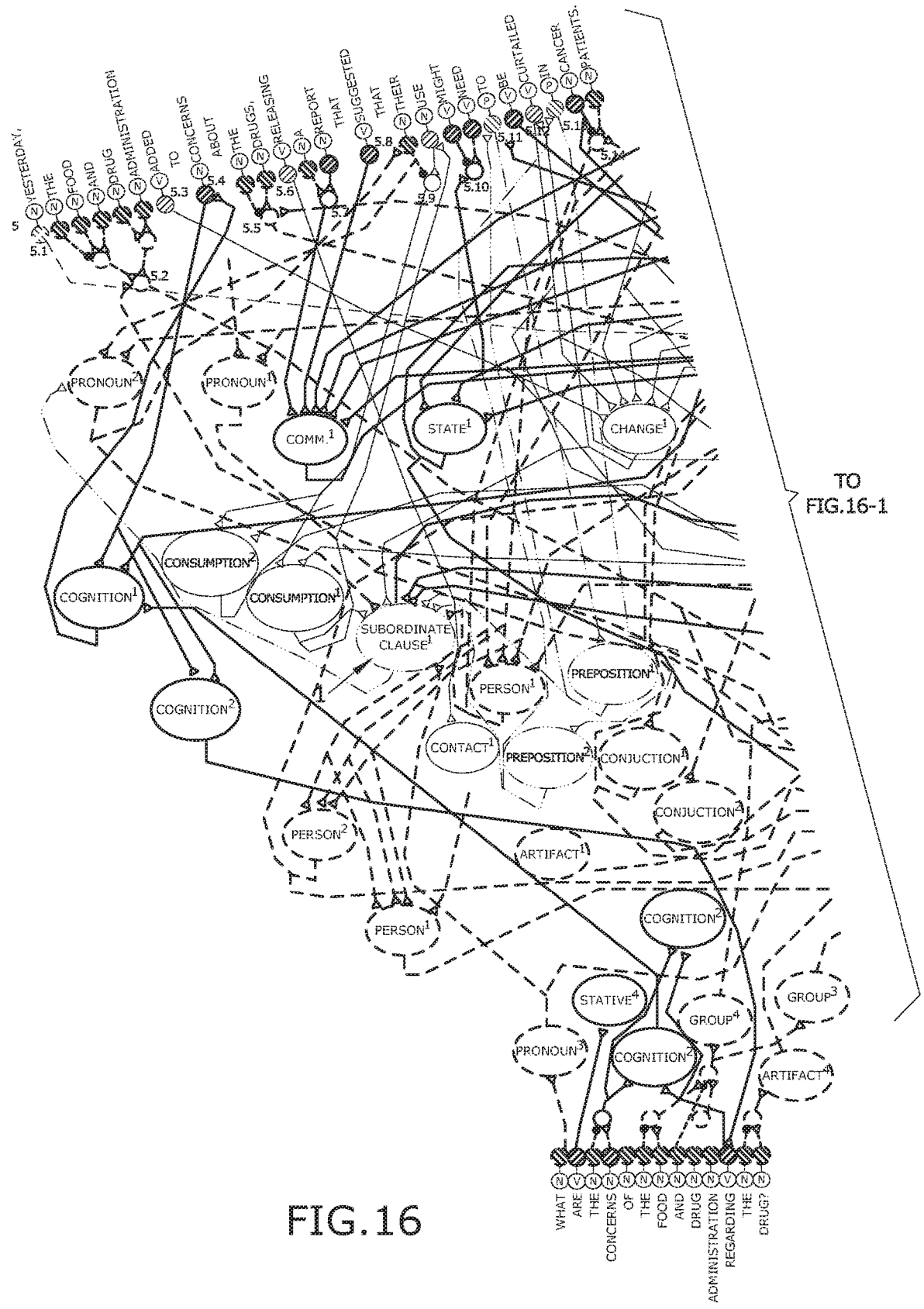
FIG. 16 illustrates a neural network that answers the question "What are concerns of the Food and Drug Administration regarding the drug?"
Figures 1, 16:
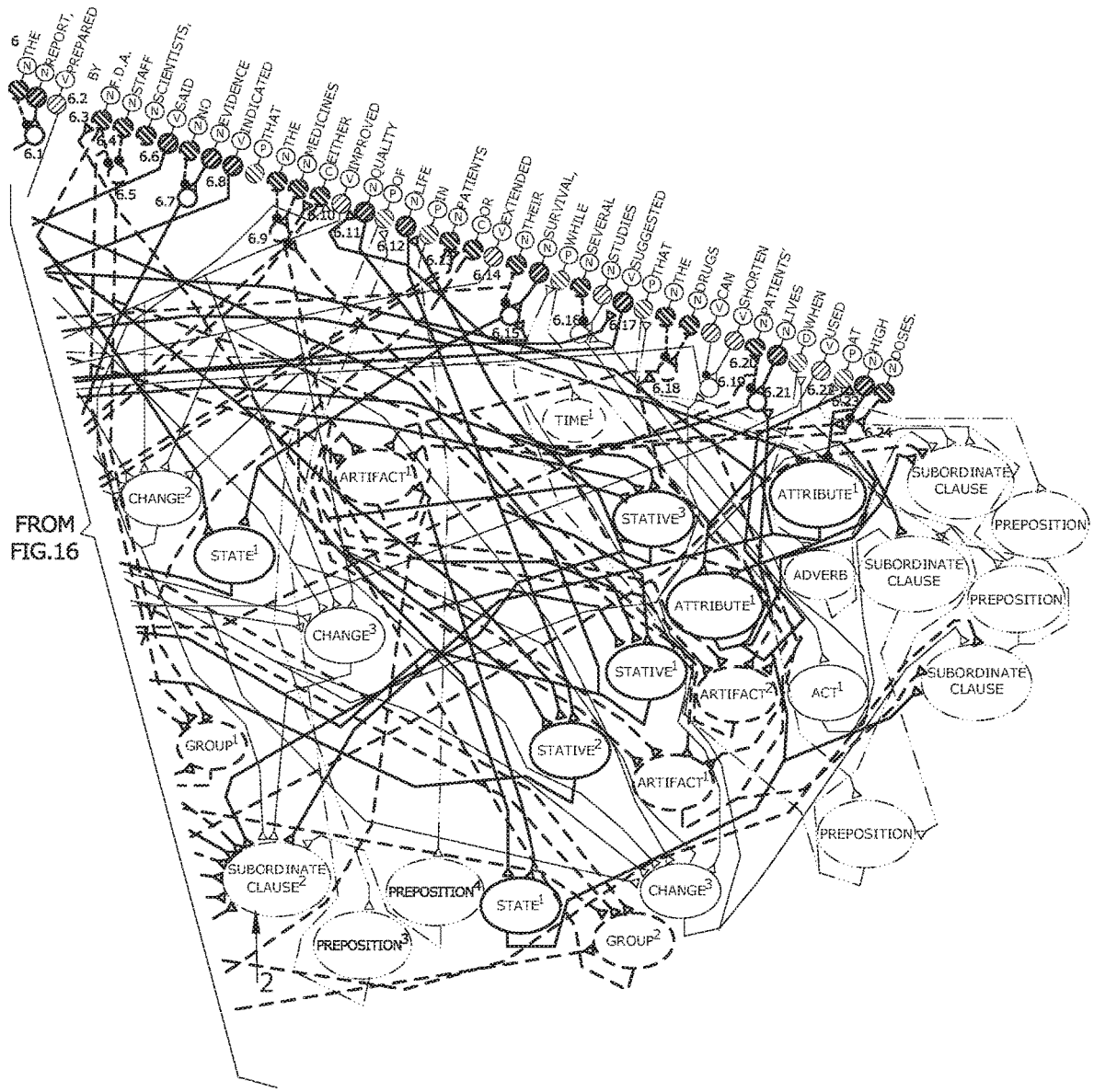

FIG. 16, 16-1 answers the question "What are concerns of the Food and Drug Administration regarding the drug?" The answer to the question is contained in two sentences with five subordinate clause. The first answer is contained in the subordinate clause$^1$ (element 1) and the second answer is contained in subordinate clause$^2$ (element 2).

Answer: the Food and Drug Administration concerns the drug their use might need to be curtailed in cancer patients. F.D.A. (no evidence) the medicines either improved quality of life in patients or extended their survival.

Figure 17:
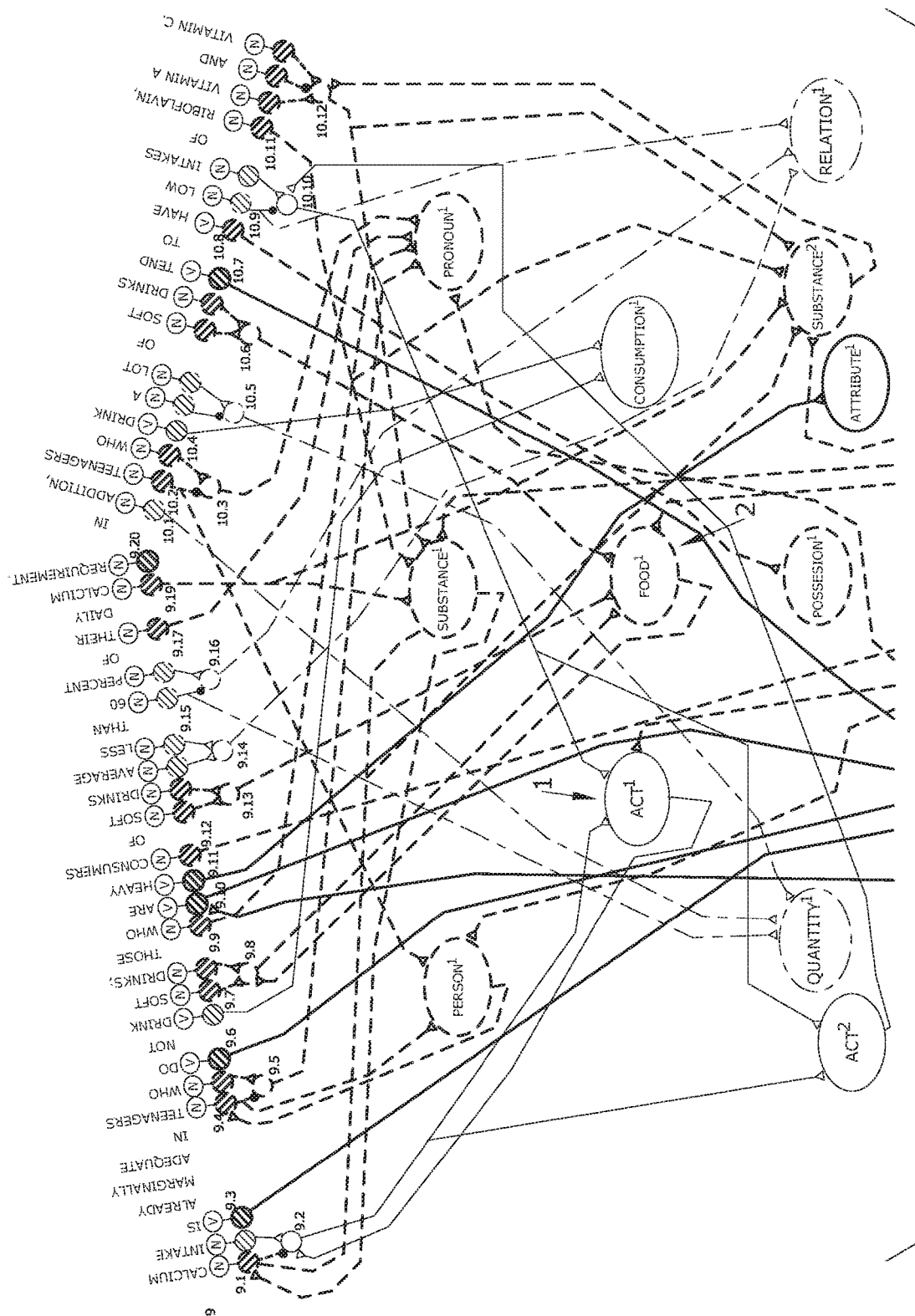
FIG. 17 illustrates a neural network that answers the question "What are the concern for teen-agers and soft drinks regarding vitamin and calcium?"
Figures 1, 17:
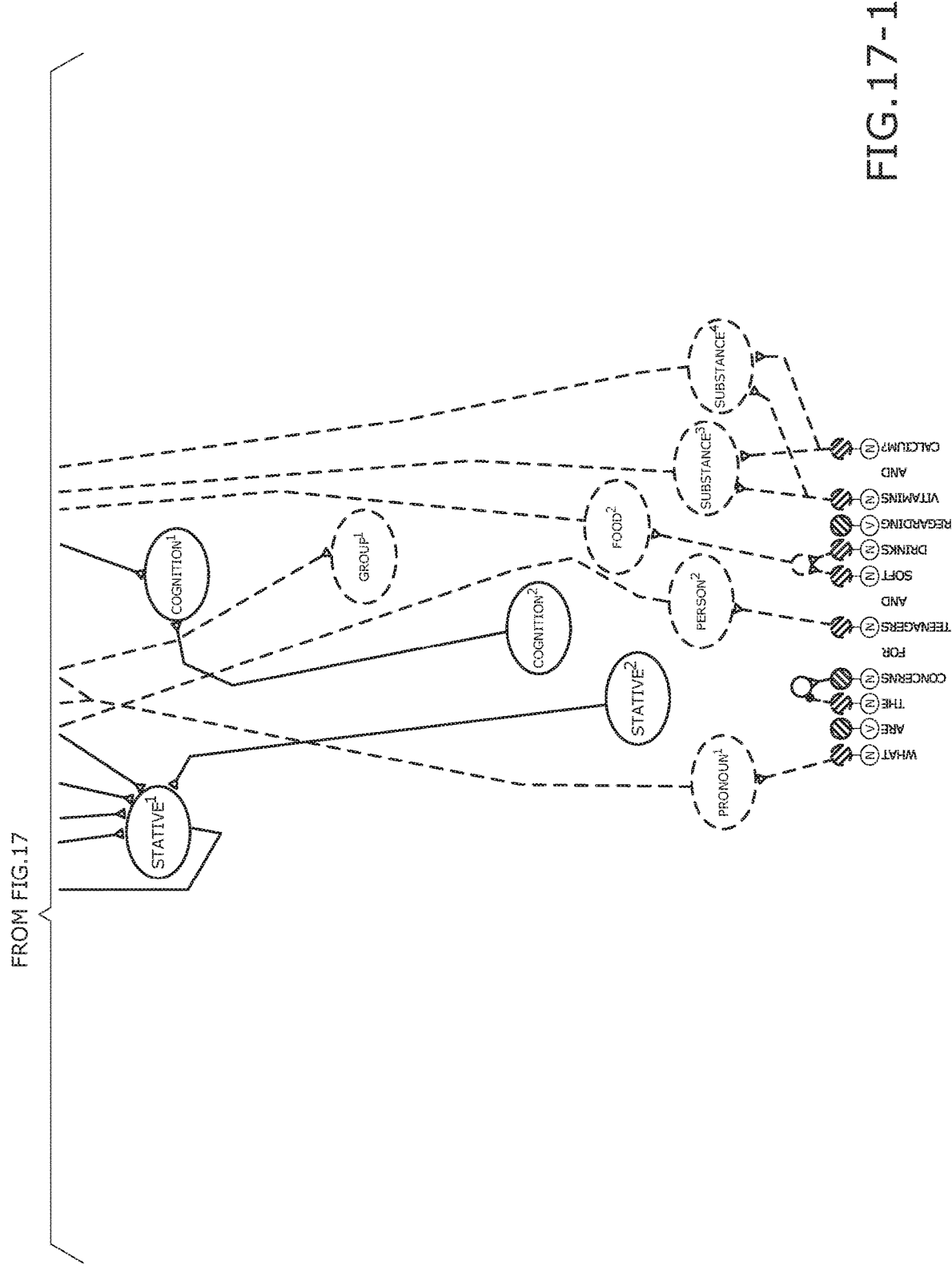

FIG. 17, 17-1 answers the question "What are the concern for teen-agers and soft drinks regarding vitamin and calcium?" The answer is contained in two sentences. The word What in the question points to both act$^1$ (element 1) and food$^1$ (element 2) and they feedback to intake and soft drink respectively.

Answer: Calcium intake teen-agers soft drinks are (low) intake (of) riboflavin, vitamin A and vitamin C.

Comprehension.

The model demonstrates how a body of text, such as a news article might be represented as a distributed neural network. The words used to construct the comprehension for the summary of the news article is based on the neuron that is pointed to by the feedback. The neuron that is pointed to by the feedback is always the first and/or the most frequent or frequent occurrence of the word for the lexical synset category. Hence, the words pointed by the feedback within the lexical synset and the most frequently used words in the summary sentence are used to construct the comprehension for the news article. For example, the first sentence in the news article usually has the most feedback since it contains a lot of key words in the news article.

One finding of this model is not only might the neurons count the part of speech to determine semantic, but also count the lexical synset as well as the most frequently used words in the news articles. Using non-linear summation, the neurons seem to count the part-of-speech, lexical synset and most frequently used words simultaneously or in parallel and sequentially to derive a comprehension of the news article. Another finding for this model is that each word in the sentence has an index number. This index number is dynamically assigned when the sentence is generated. The index number is used to locate the lexical words as well as the frequently used words and phrases used within the sentences. Another finding as comprehension takes place more lexical synset categories (neurons) as added to represent multiple feedback to a specific lexical synset. Sentences with more lexical synset have more information than sentences with fewer lexical synset. The text filtering structure that synthesized sentences into a reduced format in order to determine comprehension is another discovery for this model. The words from Table 4 and Table 5 is used to show how the words can be combined to present a synthesized version of the original sentences from the summary.

The Understanding.

This model supports answering questions about the summary text. The original sentences from the summary are used to answer the question. The questions has their own lexical synset categories which points to the lexical synset categories in the original sentences. If the lexical synset category is pointed to then it feedbacks to the words in the sentence. If the two words match then the neurons that will be given attention and for our purpose will be noted with a black postsynaptic connection otherwise the postsynaptic connection will be given the same color as the lexical synset category. The lexical synset implemented as feedback are used to form the answer to the question about the news article.

The system of the present invention may include at least one computer with a user interface. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud and the like.

The computer-based data processing system and method described above is for purposes of example only, and may be implemented in any type of computer system or programming or processing environment, or in a computer program, alone or in conjunction with hardware. The present invention may also be implemented in software stored on a non-transitory computer-readable medium and executed as a computer program on a general purpose or special purpose computer. For clarity, only those aspects of the system germane to the invention are described, and product details well known in the art are omitted. For the same reason, the computer hardware is not described in further detail.

It should thus be understood that the invention is not limited to any specific computer language, program, or computer. It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A computerized system for modeling sentences within a distributed neural network for a comprehension and an understanding of a body of text, comprising:
   a computer having a user interface; and
   a program product comprising machine-readable program code for causing, when executed, the computer to perform the following process steps:
   preparing the body of text via a preprocessor, the preprocessor configured to clean the body of text by converting each of a contraction, a hyphenated word, and an abbreviation in the body of text to one or more words;
   storing the cleaned body of text as a plain text representation of the body of text having one or more sentences;
   determining a partial semantic for each sentence in the plain text representation by tagging an identifier corresponding to at least a noun part of speech and a verb part of speech to one or more words in the plain text representation;
   determining a lexical synset for each of a key word in the one or more sentences, wherein the lexical synset identifies one or more nouns and one or more verbs in the sentence, wherein the lexical synset is represented as a distributed neural network (DNN);
   summarizing the body of text in one or more summary sentences based on the most frequently used lexical synsets; and
   deriving a comprehension of the body of text by applying a non-linear summation to count each of the at least noun part of speech and the verb part of speech, the lexical synset, and one or more most frequently used words in the body of text.

2. The computerized system of claim 1, further comprising:
   grouping the lexical synset into one of a plurality of classes.

3. The computerized system of claim 2, wherein the plurality of classes comprise:
   an action class, a collective class, a proper class, a common class, an abstract class, and a time class.

4. The computerized system of claim 3, wherein each of the plurality of classes are assigned a distinct color.

5. The computerized system of claim 1, wherein representing the lexical synsets as the DNN comprises:
   defining a framework of the DNN by a source lexical synset and one or more lexical synset categories;
   constructing the DNN using the source lexical synset and the one or more lexical synset categories, wherein each source lexical synset defines a property of a neuron in the DNN, and each of the one or more lexical synset categories defines the neuron in the DNN.

6. The computerized system of claim 5, wherein representing the lexical synsets as a distributed neural further network comprises:
   determining a feedback to the source lexical synset; and
   constructing a comprehension of the body of the text.

7. The computerized system of claim 6, further comprising:
   constructing an understanding component, configured to answer questions based on the comprehension of the body of the text.

8. The computerized system of claim 3, further comprising:
   dynamically assigning an index number when the one or more summary sentences are generated, the index number providing a sentence number location of the lexical words in the one or more summary sentences as well as position of the lexical word within the one or more summary sentences.

* * * * *